(12) United States Patent
Tsutsui

(10) Patent No.: US 6,419,076 B1
(45) Date of Patent: Jul. 16, 2002

(54) INTERMITTENT CONTAINER DISCHARGE DEVICE IN CONTINUOUS-FILLING PACKAGING SYSTEM

(75) Inventor: Shoji Tsutsui, Iwakuni (JP)

(73) Assignee: Toya Jidoki Co., Ltd., Tokyo (JP)

( * ) Notice: Subject to any disclaimer, the term of this patent is extended or adjusted under 35 U.S.C. 154(b) by 0 days.

(21) Appl. No.: 09/523,855

(22) Filed: Mar. 13, 2000

(30) Foreign Application Priority Data

Mar. 11, 1999 (JP) ........................................ 2000-064200
Feb. 15, 2000 (JP) ........................................ 2000-036278

(51) Int. Cl.$^7$ ............................................. B65G 29/00
(52) U.S. Cl. ................................ 198/465.2; 198/862.11; 198/803.14; 53/564; 53/570; 141/166; 141/179; 141/239; 141/316
(58) Field of Search ........................... 198/418.5, 465.2, 198/862.11, 803.14; 53/459, 564, 570; 141/166, 179, 237, 316

(56) References Cited

U.S. PATENT DOCUMENTS

| | | | | |
|---|---|---|---|---|
| 2,551,080 A | | 5/1951 | Allen et al. .............. | 198/343.1 |
| 3,455,434 A | * | 7/1969 | Lorken .................... | 198/418.5 |
| 4,843,797 A | * | 7/1989 | Butterly, Jr. et al. .. | 198/418.5 X |
| 5,450,941 A | * | 9/1995 | Loewenthal ............. | 198/418.5 |
| 5,570,567 A | * | 11/1996 | Laubscher et al. ... | 198/418.5 X |
| 5,660,264 A | | 8/1997 | van der Schoot ........... | 198/594 |
| 5,673,535 A | * | 10/1997 | Jagger ................... | 198/803.14 |
| 6,079,546 A | * | 6/2000 | Marti Sala ............ | 198/803.14 |
| RE37,471 E | * | 12/2001 | Jagger ................... | 198/803.14 |

\* cited by examiner

Primary Examiner—Stephen T. Gordon
Assistant Examiner—Lori L Coletta
(74) Attorney, Agent, or Firm—Koda & Androlia

(57) ABSTRACT

A discharge device which, in a retainer type continuous-filling packaging system, extracts full bags (bags filled with contents) from retainers that are continuously fed at a constant speed and discharges these full bags after converting the movement of the bags into an intermittent movement of a plurality of rows. The discharge device includes a full-bag holding member conveying device and a product-conveying conveyor. In the full-bag holding member conveying device, numerous full-bag holding members that have therein the full bags and are disposed at equal intervals are moved in one direction along a ring-form track (or race-track path) which has a pair of parallel sections, and during this movement, the full-bag holding members are moved continuously at a constant speed on a bag entry side of the parallel sections and are moved intermittently a specified distance (which is a distance equal to an integral multiple of an attachment spacing of said full-bag holding members) on a bag exit side of the parallel sections. The product-conveying conveyor receives the full bags in a plurality of rows discharged from the full-bag holding members and conveys these bags "as is" in a plurality of rows. On the bag entry side, the discharge device continuously receives the full bags from the retainers that are continuously conveyed at a constant speed; and on the bag exit side, the discharge device discharges the full bags in a plurality of rows from the full-bag holding members that are stopped

10 Claims, 30 Drawing Sheets

FIG. 3

| OPERATING PATTERN | | ADVANCE RETURN ADVANCE RETURN ADVANCE |
|---|---|---|
| SPEED OF MOTOR M₁ (ROTATIONAL CONVEYING SPEED OF EMPTY-BAG HOLDING MEMBERS) | $U_2$ $U_1$ 0 | |
| SPEED OF MOTOR M₂ (SPEED OF RECIPROCATING MOVEMENT OF ROTATIONAL CONVEYING MECHANISM) | $U_3$ 0 $-U_4$ | |
| SPEED OF MOTOR M₃ (RETAINER CONVEYING SPEED) | $V_0$ 0 | |
| SYNTHESIZED SPEED OF EMPTY-BAG HOLDING MEMBERS ON BAG ENTRY SIDE | $-V_3$ (0) $-V_4$ | |
| SYNTHESIZED SPEED OF EMPTY-BAG HOLDING MEMBERS ON BAG EXIT SIDE | $V_1$ ($V_2$) 0 | |

INTERMITTENT CONTAINER DISCHARGE DEVICE IN CONTINUOUS-FILLING PACKAGING SYSTEM

BACKGROUND OF THE INVENTION

1. Field of the Invention

The present invention relates to a continuous-filling packaging system in which containers (e.g., bags) are subjected to various packaging operations such as filling of the containers with the contents and sealing of the opening parts, etc., while the containers are continuously conveyed at a high speed; and more particularly to an intermittent container discharge device which is used in such a packaging system so as to convert the movement of full containers (filled containers) that are continuously conveyed in a single row into an intermittent movement in a plurality of rows.

2. Prior Art

Conventional retainer type filling packaging systems, in which bags are accommodated in retainers, and packaging operations are performed on the bags inside the retainers while the retainers are being conveyed, are described in, for example, Japanese Patent Application Laid-Open (Kokai) Nos. S58-73501 and S58-82801.

These systems are designed in the following manner:

A plurality of retainers which have been conveyed by a single-row conveyor are temporarily stopped and arranged, and a group of retainers which takes this plurality of containers as a unit is intermittently caused to advance, so that this group of retainers is fed onto an intermittently driven multi-row conveyor. Empty bags are simultaneously inserted into this group of retainers on the multi-row conveyor; then, after the mouths of the respective bags have been opened, the retainers of the above-described group are simultaneously pushed out from the multi-row conveyor onto a single-row conveyor. The retainers that have been thus pushed out onto this single-row conveyor are continuously conveyed and are continuously subjected to various packaging operations by a rotary type filling device, sealing device and cooling sealing device. The retainers are then again pushed onto an intermittently driven multi-row conveyor from the single-row conveyor as a group of retainers in which the above-described multiple number of containers are taken as a unit. The retainers are subjected to a cooling operation on this multi-layer conveyor. Furthermore, the discharge operation which extracts the full bags (filled bags) from the retainers is performed in the vicinity of the terminal end of the multi-layer conveyor, and the empty retainer group is pushed back out onto the single-row conveyor.

In such a retainer type filling packaging system, the efficiency of bag supply and discharge is increased by simultaneously supplying empty bags into a plurality of retainers or simultaneously extracting full bags from a plurality of retainers, so that continuity of processing with other devices that can be continuously operated at a high speed (filling devices, sealing devices, etc.) is maintained, thus improving productivity.

However, there are limits to the possible speed increase of the above-described intermittent operation itself, in which continuously conveyed retainers are temporarily stopped, and are then pushed by a pusher after a plurality of retainers have been gathered together. Accordingly, if an even greater improvement in bag supply and discharge efficiency is to be made, the number of containers handled as a group must be increased. If the number of retainers handled as a group is increased and the multi-row conveyor is widened, other problems occur. Installation of the insertion means used to insert bags into the retainers on the multi-row conveyor and the extraction means used to extract bags from the retainers becomes difficult. In particular, the replenishment of bags and maintenance in the portion of the insertion means positioned near the center of the multi-layer conveyor become difficult.

Furthermore, when the intermittent operation in which continuously conveyed retainers are temporarily stopped and a plurality of retainers are pushed out together by a pusher is performed, a large noise is constantly generated as a result of the retainers colliding with each other or with the pusher. This noise increases as the speed of the intermittent operation is increased.

In the retainer type filling packaging system, a much higher operating speed is possible for the rotary type filling device and sealing device. However, the intermittent operation in the supply of bags to the retainers and the discharge of the bags from the retainers forms a bottleneck, so that the improvement in the production efficiency of the retainer type filling packaging system as a whole is limited as described above. Though it is not impossible to perform the discharge of the bags from the retainers in a continuous manner on a single-row conveyor, if a high-speed operation is performed, a large quantity of bags exceeding the processing capacity per row will be conveyed in one row on the discharge conveyor. As a result, problems occur in subsequent processes such as packing the bags into boxes, etc.

In another type of filling packaging system that can be continuously operated at a high speed, such as the spout-equipped bag filling packaging system, a continuous packaging processing at a high speed by means of rotary type devices can be performed for the insertion of the spouts into the bags, the sealing of the mouths of the bags, the filling of the bags with a liquid following the attachment of the spouts, and the capping of the bags, etc. However, problems that are more or less similar to those seen in a retainer type filling packaging system occur. The intermittent operation involved in the supply of the bags similarly forms a bottleneck, and the improvement in the production efficiency of the spout-equipped bag filling packaging system as a whole is limited.

SUMMARY OF THE INVENTION

The present invention is made in light of the above-described conventional problems.

One object of the present invention is to improve productivity in a continuous-filling packaging system for containers by increasing the speed of the full container discharge operation and allowing a high-speed operation of the system as a whole.

Furthermore, another object of the present invention, especially in a retainer type system, is to obtain a discharge device which continuously extracts full containers from retainers continuously conveyed in a single row without stopping the retainers and discharges these full containers to the outside of the system after converting only the movement of the full containers into an intermittent movement in a plurality of rows.

Still another object of the present invention is to prevent the number of bags (or containers) conveyed per row from exceeding the treatment capacity of the subsequent process by discharging the continuously conveyed full containers after converting the single row of containers into a plurality of rows of containers.

The present invention is for an intermittent container discharge device which is used in a continuous-filling packaging system, and it converts the movement of full containers that are continuously fed in a single row into an intermittent movement in a plurality of rows and discharges the full containers out of the packaging system.

More specifically, the intermittent container discharge device is equipped with a container holding member conveying device in which numerous container holding members disposed at equal intervals are moved in one direction along a ring-form track (or a race-track shape path) which has a pair of parallel sections, and in which, during this movement, the container holding members are moved continuously at a constant speed on a first side of the parallel sections and are moved intermittently a certain distance (which is a distance equal to an integral multiple of an attachment spacing of the container holding members) on a second side of the parallel sections; and the intermittent container discharge device continuously receives full containers by the continuously moving container holding members on the first side of the parallel sections and discharges full containers in a plurality of rows from the stopped container holding members on the second side of the parallel sections.

In the above structure, a product-conveying device, which receives full bags (or full containers) discharged in a plurality of rows from the container holding members and conveys these full bags "as is" in a plurality of rows, may be installed on the second side of the parallel section of the ring-form track.

The above-described container holding member conveying device is equipped with, for instance, a rotational conveying mechanism and a reciprocating driving mechanism. The rotational conveying mechanism rotationally conveys numerous container holding members disposed at equal intervals in one direction along the ring-form track which has a pair of parallel sections, and the reciprocating driving mechanism causes the rotational conveying mechanism as a whole to perform a reciprocating movement through a specified distance along the parallel sections. The rotational conveying mechanism and reciprocating driving mechanism are equipped with respectively independent driving sources. The container holding members have a movement speed resulting from the synthesis of the rotational conveyance and the reciprocating movement.

When the above-described continuous-filling packaging system is a retainer type system, it is preferable to install a retainer conveying device which continuously conveys numerous retainers accommodating full containers at the same intervals as the intervals of the container holding members and at the same speed as the movement speed of the container holding members along the first side of the parallel sections, so that full containers accommodated inside the retainers are received by the container holding members. In this case, the container holding members are raised and lowered while being moved along the ring-form track, so that the container holding members are lowered on the first side of the parallel sections to grip the full bags accommodated inside the retainers and then raised to extract the full bags from the retainers.

Furthermore, a loop type transfer device can be installed, on the first side of the parallel sections, as a part of the above-described intermittent container discharge device. The loop type transfer device includes numerous transfer means that are disposed at equal intervals and moved continuously at a constant speed along a fixed-position ring-form track which has a pair of parallel sections. This loop type transfer device continuously receives full containers through the continuously moving transfer means on a first side of the parallel sections of the fixed-position ring-form track, and continuously supplies these full containers to the continuously moving container holding members on a second side of the parallel section. In other words, in this case, the above-described container holding member conveying device continuously receives full containers via the loop type transfer device and intermittently discharges the full containers in a plurality of rows. Needless to say, the attachment spacing and movement speed of the transfer means are set so as to agree with those of the container holding members.

In cases where the continuous-filling packaging system equipped with this intermittent container discharge device is a retainer type system, it is preferable to install a retainer conveying device. This retainer conveying device conveys numerous retainers accommodating full containers at the same intervals as the intervals of the container holding members and at the same speed as the movement speed of the container holding members along the first side of the parallel sections of the fixed-position ring-form track of the loop type transfer device, so that full containers accommodated in the continuously moving retainers are received by the transfer means. In this case, the above-described transfer means are caused to be raised and lowered at a specified timing while being moved along the fixed-position ring-form track, so that the transfer means is lowered on the first side of the parallel sections to grip the full bags accommodated inside the retainers and then is raised to extract the full bags from the retainers.

Furthermore, a rotary type transfer device which has numerous transfer means disposed at equal intervals may be installed on the first side of the above-described parallel sections as a part of the intermittent container discharge device. This rotary type transfer device continuously receives full containers from the rotor of a device which is of the preceding process through the continuously rotating transfer means and then continuously supplies these full containers to the container holding members. In other words, in this case, the container holding member conveying device continuously receives full containers via the rotary type transfer device and intermittently discharges the full containers in a plurality of rows. Needless to say, the attachment spacing and rotational movement speed of the transfer means are set to agree with those of the container holding members.

BRIEF DESCRIPTION OF THE DRAWINGS

FIG. 3 is a diagram which illustrates the operating pattern of the empty-bag holding member conveying device;

DETAILED DESCRIPTION OF THE PREFERRED EMBODIMENTS

The present invention will be described in detail below with reference to FIGS. 1 through 30.

Figure 1:
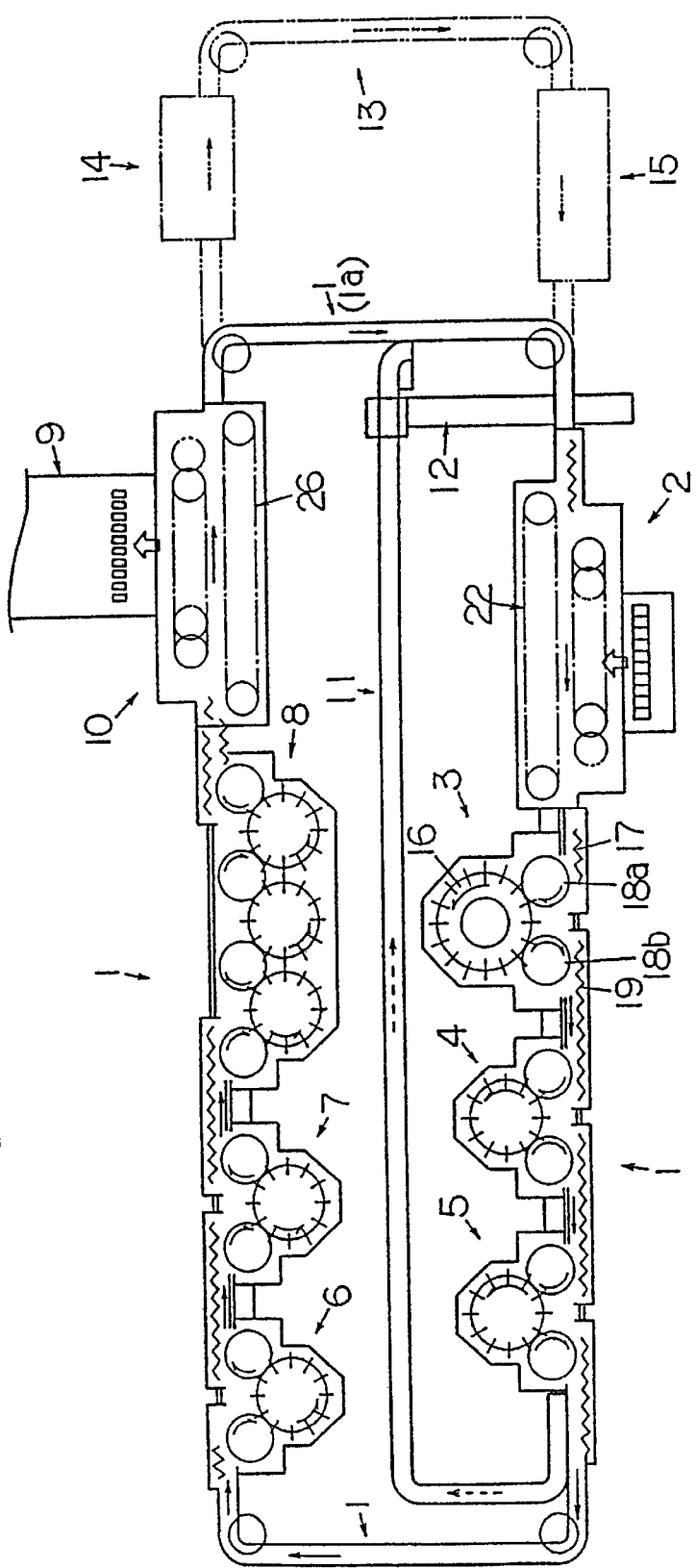
FIG. 1 is a schematic diagram which illustrates the overall retainer type continuous-filling packaging system according to the present invention.

FIGS. 1 through 21 indicate an embodiment in which the present invention is applied to a retainer type continuous-filling packaging system, and FIG. 1 is a schematic plan view of this retainer type continuous-filling packaging system. In this retainer type continuous-filling packaging system, the retainers are conveyed by a conveyor over a conveying path formed in the shape of a loop and are subjected to various types of filling and packaging processing by a plurality of rotary type processing devices disposed along this conveying path.

The devices disposed along the main conveying path (indicated by solid arrows) 1 are a retainer conveying device 22 which conveys retainers at a constant speed, a continuous bag supply device 2 which continuously supplies empty bags to these retainers, a bag mouth opening device 3, a liquid preparatory filling device 4, a solid matter filling device 5, a liquid filling device 6, a steam degassing device 7, a sealing device 8, and a container discharge device 10 which extracts the full bags (or full containers) held in the retainers conveyed at a constant speed and intermittently discharges these full bags onto a product-conveying conveyor 9.

Furthermore, a defective bag discharge device 12 is installed along a defective retainer discharge path 11 (indicated by broken-line arrows), and a retainer cleaning device 14 and drying device 15 are installed along a cleaning path 13 (indicated by a two-dot chain lines). The cleaning path 13 is ordinarily closed, and it is opened when the retainers have become soiled.

First, the various devices installed along the main conveying path 1 will be described.

Empty retainers R (shown for example in FIG. 14(a)) are supplied with empty bags W by the continuous bag supply device 2 (which will be described in detail later), and the side edges of the empty bags W are inserted into the insertion grooves Rb of the retainers R (see FIG. 14(b)), and the retainers R are conveyed to the bag mouth opening device 3.

The bag mouth opening device 3 is a rotary type bag mouth opening device, and it is equipped with a processing rotor (opening rotor) 16 which has a plurality of opening means disposed at equal intervals around its circumference. When retainers R which have empty bags W inserted into their insertion grooves Rb are introduced, the opening means open the mouths of the empty bags W by applying vacuum suction from both sides during one rotation of the bag mouth opening device 3 (see changes shown in FIG. 14(b)→14(c)) and feed the empty bags W into the next process. The introduction of retainers R onto the processing rotor 16 is accomplished by a timing screw 17 and star wheel 18a which rotate in synchronization, and the feed-out of retainers R into the next process is accomplished by a star wheel 18b and timing screw 19.

The liquid preparatory filling device 4, solid matter filling device 5, liquid filling device 6, steam degassing device 7 and sealing device 8 are all rotary type devices. They are equipped with processing rotors that performed various types of filling and packaging processing, and the introduction and feed-out of retainers R are accomplished by star wheels and timing screws.

The bags (or containers) are preparatorily filled with liquid by the liquid preparatory filling device 4, filled with solid matter by the solid matter filling device 5, and further filled with liquid by the liquid filling device 6. In this case, the preparatory filling with liquid is performed prior to filling with solid matter so as to prevent in advance the accumulation of air in the bottom of the bag that would be caused as a result of the filling with solid matter. Next, steam is blown in by the steam degassing device 7 so as to drive the air out of the bag, and the mouth of each bag is immediately provisionally sealed; and in the sealing device 8, a second sealing and cooling-sealing (cooling of the sealed portion) are performed.

In the discharge device 10, the sealed full bags (or filled bags) are continuously extracted from the conveyed retainers R, and the extracted bags are intermittently discharged onto the product-conveying conveyor 9 so that the bags are arranged in a plurality of rows. The empty retainers R are fed out from the discharge device 10 and conveyed toward the continuous bag supply device 2 along the main conveying path 1.

The defective retainer discharge path 11 branches off from the main conveying path 1 on the downstream side of the solid matter filling device 5 and rejoins the main conveying path 1 on the upstream side of the continuous bag supply device 2.

More specifically, a defective retainer discharge means (not shown) removes empty retainers into which no bag has been inserted from the main conveying path 1, and it also removes retainers into which defective bags (bags with problems that would hinder normal packaging processing, such as bags that have not been opened, bags that have undergone a positional shift inside the retainer, bags with insufficient measurements or bags with liquid adhering to the sealed portion, etc.) have been inserted from the main conveying path 1. The defective retainer discharge means further feeds these removed retainers onto the defective retainer discharge path 11. The defective bags are then extracted from the retainers by the defective bag discharge device 12, and empty retainers are caused to rejoin the main conveying path (1 (1a).

The cleaning path 13 connects the downstream side of the discharge device 10 and the upstream side of the continuous bag supply device 2. When the retainers have become soiled, this path is used instead of the main conveying path 1 (1a). The soiled retainers are cleaned by the retainer cleaning device 14 and dried by the drying device 15; afterward, the retainers are fed out onto the main conveying path 1 at a point which is on the upstream side of the continuous bag supply device 2.

Figure 2:
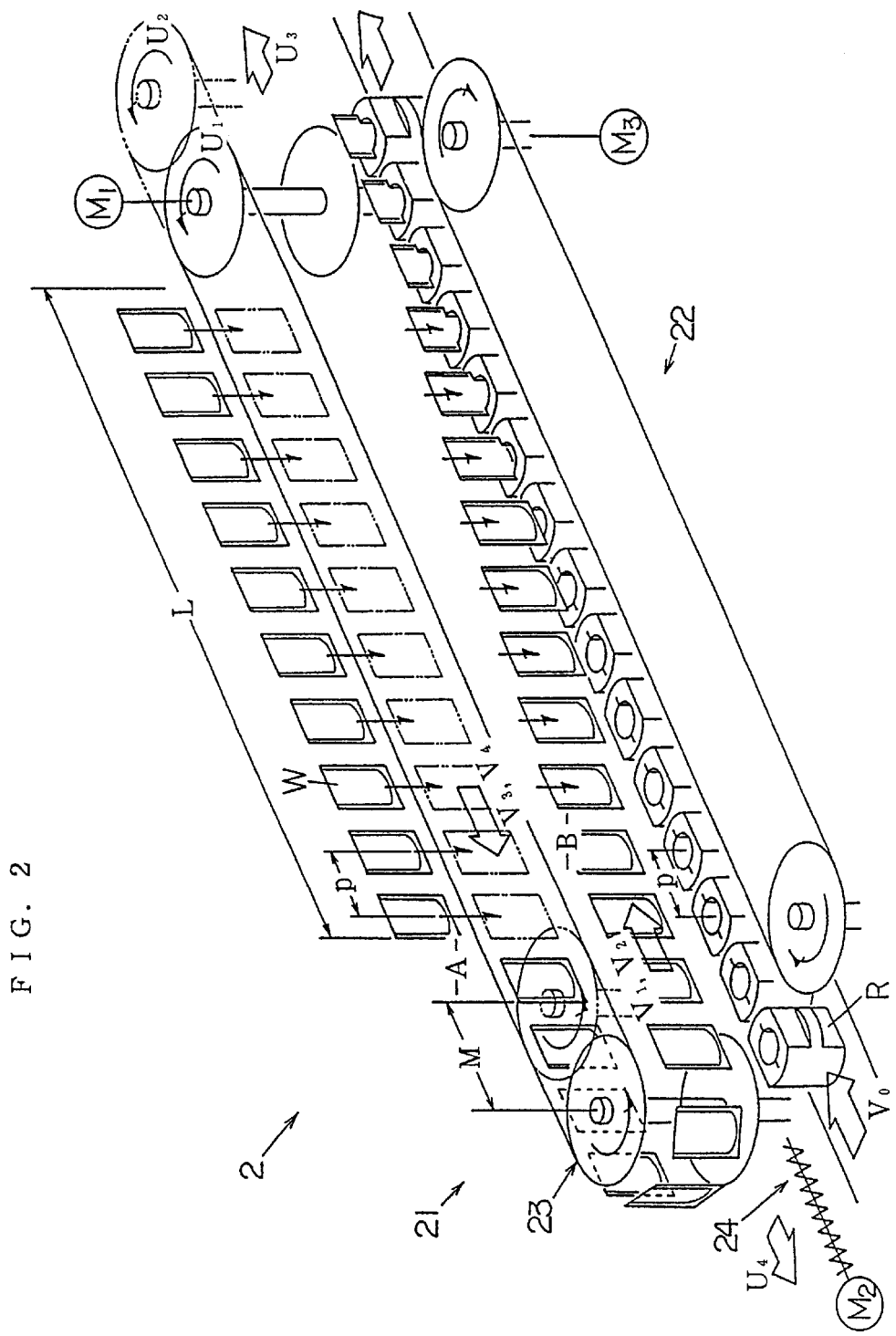
FIG. 2 is a conceptual diagram which explains the function of the continuous bag supply device of the present invention.

Next, the continuous bag supply device 2 in the present invention will be described in detail. FIG. 2 shows the continuous bag supply device 2 and retainer conveying device 22.

The continuous bag supply device 2 comprises an empty-bag holding member conveying device 21 and an intermittent bag supply device (not shown).

The empty-bag holding member conveying device 21 includes a rotational conveying mechanism 23 and a reciprocating driving mechanism 24. The rotational conveying mechanism 23 rotationally conveys numerous empty-bag holding members (in FIG. 2, empty bags W are shown instead of the empty-bag holding members) disposed at equal intervals on an endless conveyor chain in one direction along a ring-form track (or a race-track shape path) that has a pair of parallel sections (driving in this case is accomplished by a variable-speed driving motor $M_1$). The reciprocating driving mechanism 24 causes a reciprocating movement of the rotational conveying mechanism 23 as a whole through a specified distance along the parallel sections (driving in this case is accomplished by means of a variable-speed driving motor $M_2$).

The intermittent bag supply device (not shown) is disposed on a first side of the parallel sections (i.e., on the bag entry side A) and simultaneously supplies empty bags W to a plurality of empty-bag holding members that are moved along the bag entry side A, thus supplying one empty bag W to each empty-bag holding member.

Meanwhile, the retainer conveying device 22 is disposed on a second side of the parallel sections (i.e., the bag exit side B). The retainer conveying device 22 continuously conveys numerous retainers R at equal intervals and at a constant speed along the parallel section. The insertion device extracts empty bags W from the empty-bag holding members that are moved along the bag exit side B and further inserts these empty bags W into the retainers R being conveyed underneath. The attachment pitch of the empty-bag holding members on the conveyor chain of the rotational conveying mechanism 23 is set to be equal to the conveying pitch of the retainers R.

In the empty-bag holding member conveying device 21, the rotational conveying mechanism 23 rotationally conveys empty-bag holding members by means of the variable-speed driving motor $M_1$. The rotational conveying mechanism 23 as a whole makes a reciprocating movement for a specified distance along the parallel sections by the variable-speed driving motor $M_2$. Meanwhile, the retainer conveying device 22 conveys retainers R at a constant speed ($V_0$) in the same direction as the conveying direction on the bag exit side B of the ring-form track by the driving motor $M_3$.

The rotational conveying speed of the empty-bag holding members produced by the driving motor $M_1$ and the speed of the reciprocating movement of the rotational conveying mechanism 23 produced by the driving motor $M_2$ are set to be different between its advancing movement (movement in the conveying direction of the retainers R which is the movement from the solid line toward the two-dot chain line in FIG. 2) and return movement (movement from the two-dot chain line toward the solid line). In this case, on the bag entry side A, the rotational conveying speed ($U_1$) of the empty-bag holding members produced by the driving motor $M_1$ during the advancing movement and the speed of the advancing movement ($U_3$) of the rotational conveying mechanism 23 produced by the driving motor $M_2$ are synthesized (or mutually canceled) so that the moving speed of the empty-bag holding members becomes zero. Furthermore, on the bag exit side B, the rotational conveying speed of the empty-bag holding members ($U_1$ during advancing movement, $U_2$ during return movement) produced by the driving motor $M_1$ during reciprocating movement and the reciprocating movement speed of the rotational conveying mechanism 23 ($U_3$ during advancing movement, $U_4$ during return movement) produced by the driving motor $M_2$ are also synthesized, so that the moving speed of the empty-bag holding members is always the same as the conveying speed of the retainers R.

As a result of setting the speeds as described above, empty bags W are supplied to empty-bag holding members, which have a moving speed of zero (i.e., which are in a stopped state), from the intermittent bag supply device (not shown) during the advancing movement of the rotational conveying mechanism 23 on the bag entry side A. On the other hand, on the bag exit side B, empty bags W are discharged from empty-bag holding members, which is moving at the same speed as the retainers R, and continuously put in the retainers R. Since empty bags W are supplied to a plurality of empty-bag holding members at one time on the bag entry side A, the working efficiency of the continuous bag supply device 2 is improved.

In the above-described continuous bag supply device 2 and retainer conveying device 22, the driving conditions, etc. of the respective driving motors can be determined once the conditions are set. The conditions are, for instance, the processing capacity S (bags/minute), the number of bags n supplied at one time (number), the conveying pitch of the retainers R (which is equal to the attachment pitch of the empty-bag holding members) and the advancing movement time of the rotational conveying mechanism 23 (which is equal to intermittent stopping time of the empty-bag holding members on the bag entry side A) $t_1$ (seconds).

The formulae shown below are examples of calculations for a case in which it is assumed that the switching from the speed during advancing movement to the speed during return movement (or the switching from the speed during return movement to the speed during advancing movement) is performed instantly in the respective driving motors as shown in FIG. 3.

In the formulae shown below, the respective symbols have the following meanings:

$t_2$: return movement time of the rotational conveying mechanism (=intermittent moving time of the container holding members on the bag entry side A)

M (m): advancing movement distance (=return movement distance) of the rotational conveying mechanism $U_1$ (m/minute): rotational conveying speed of the empty-bag holding members (during advancing movement of the rotational conveying mechanism)

$U_2$ (m/minute): rotational conveying speed of the empty-bag holding members (during return movement of the rotational conveying mechanism)

$U_3$ (m/minute): advancing movement speed of the rotational conveying mechanism $U_4$ (m/minute): return movement speed of the rotational conveying mechanism $V_0$ (m/minute): conveying speed of the retainers $V_1$ (m/minute): synthesized moving speed of the empty-bag holding members on the bag exit side B (during advancing movement of the rotational conveying mechanism)

$V_2$ (m/minute): synthesized moving speed of the empty-bag holding members on the bag exit side B (during return movement of the rotational conveying mechanism)

$V_3$ (m/minute): synthesized moving speed of the empty-bag holding members on the bag entry side A (during advancing movement of the rotational conveying mechanism)

$V_4$ (m/minute): synthesized moving speed of the empty-bag holding members on the bag entry side A (during return movement of the rotational conveying mechanism)

$$t_2 = 60 \times n/S - t_1$$

$$M = (t_1 \times S \times p/2)/60$$

$$U_1 = S \times p/2$$

$$U_2 = S \times p + (t_1 \times S \times p/2)/(60 \times n/S - t_1)$$

$$U_3 = S \times p/2$$

$$U_4 = (t_1 \times S \times p/2)/(60 \times n/S - t_1)$$

$$V_0 = V_1 = V_2 = p \times S$$

$$V_3 = 0$$

$$V_4 = 60 \times n \times p/(60 \times n/S - t_1)$$

Furthermore, where L is the distance that the empty-bag holding members are conveyed during the return movement on the bag entry side A (i.e., the distance obtained by synthesizing the conveying distance of the rotational conveying mechanism and the distance of the return movement of the rotational conveying mechanism), this L can be called the distance advanced at a synthesized speed of $V_4$ during the return movement time ($t_2/60$) minutes. Therefore, L can be expressed as follows:

$$L = V_4 \times t_2/60$$

Furthermore, the following is obtained by substituting $V_4$ and $t_2$ into this equation:

$$L = p \times n$$

In other words, on the bag entry side A of the rotational conveying mechanism 23, n number of empty-bag holding members are conveyed at a time during the return movement time, and n number of empty bags W are supplied at a time during the advancing movement time. As a result, a successive supply of empty bags W can be intermittently performed for all of the empty-bag holding members, and the conveying of empty-bag holding members with empty bags missing can be prevented.

Furthermore, in the above-described examples of calculation, it is assumed that the switching of the speeds of the respective driving motors is performed instantaneously. In an actual device, however, the switching of the speeds of the driving motors cannot be performed instantaneously, and acceleration and deceleration operations occur only during switching. Accordingly, calculations must be performed with this point taken into account.

Figure 4:
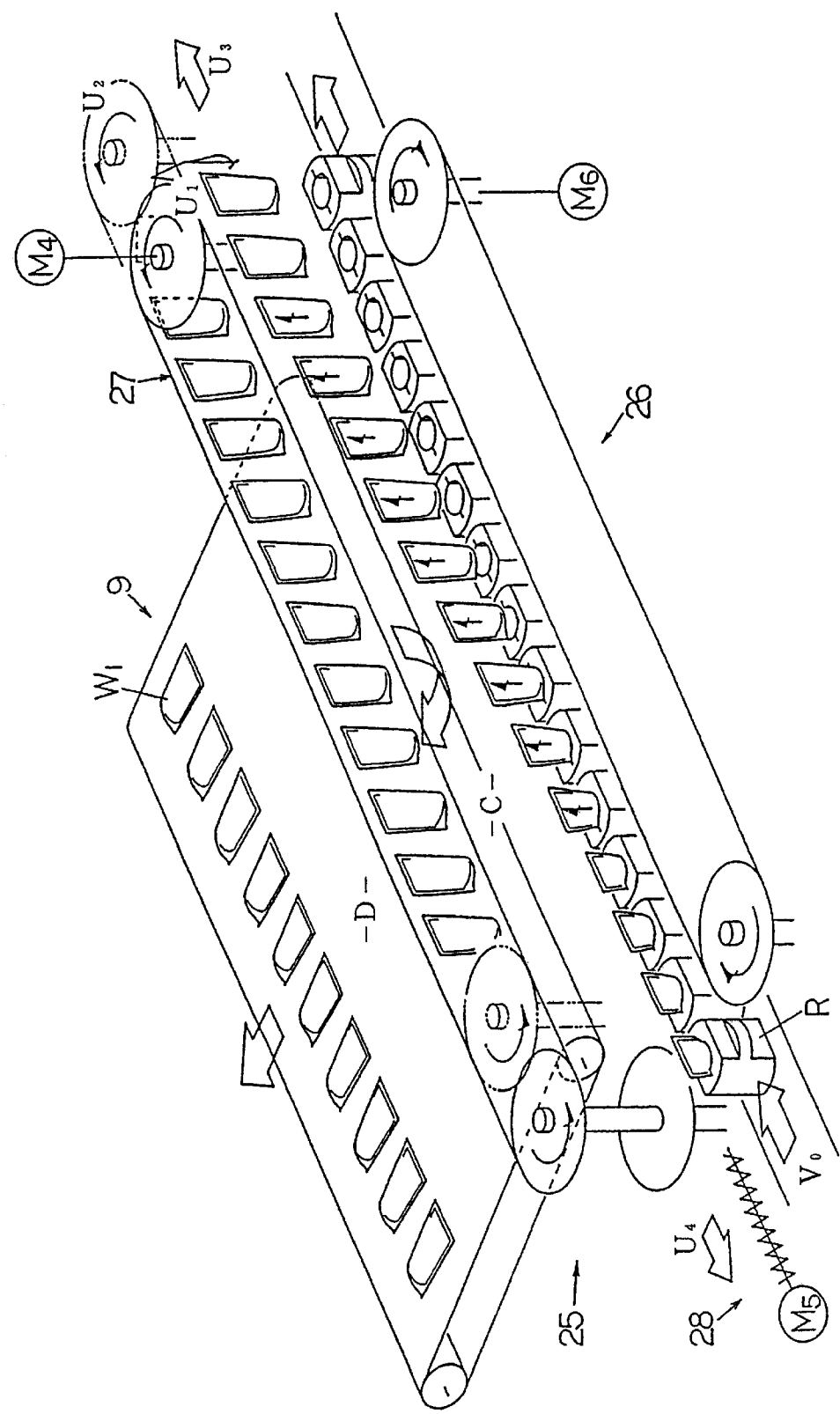
FIG. 4 is a conceptual diagram showing the function of the discharge device.
Figure 5:
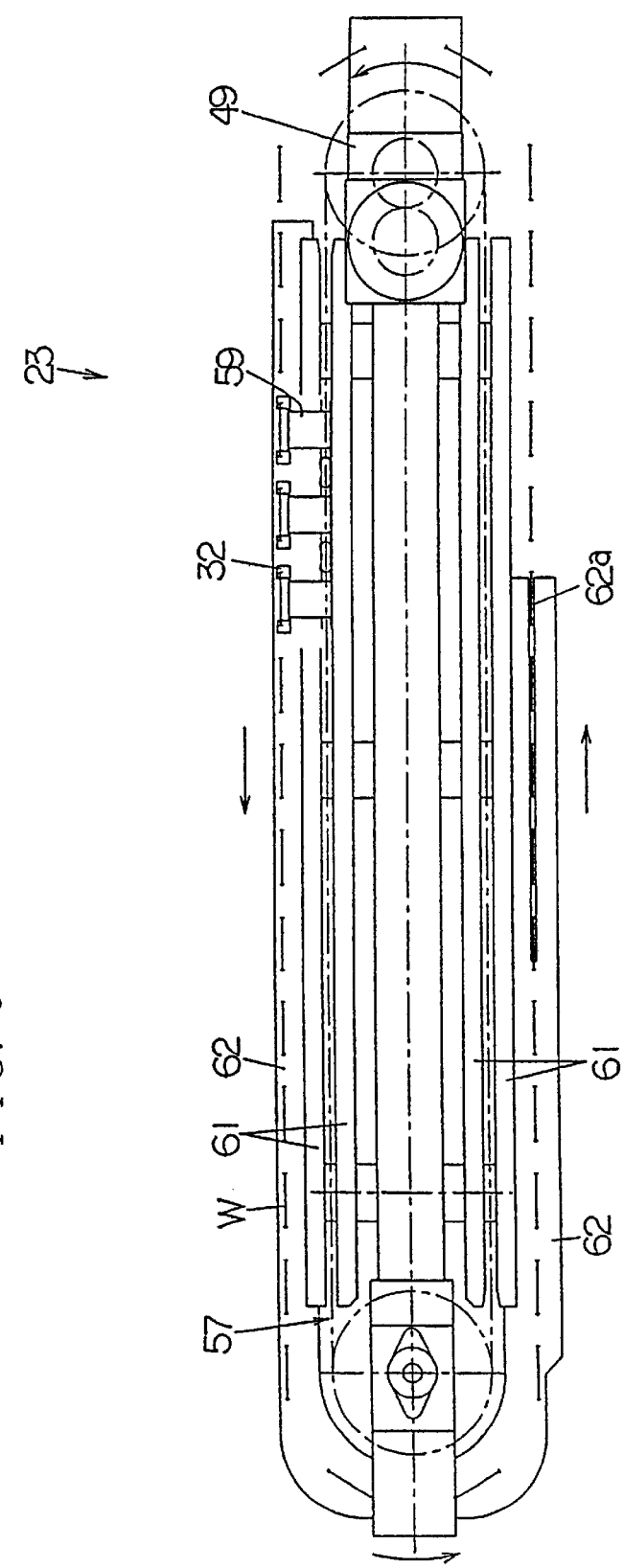
FIG. 5 is a plan view of the empty-bag holding member conveying device.

FIG. 4 is a schematic diagram of the discharge device 10 in the present invention. This discharge device 10 is installed in the vicinity of the retainer conveying device 26 and comprises a full-bag holding member conveying device 25 (including a full-bag holding member release device, not shown) and a product-conveying conveyor 9. The full-bag holding member conveying device 25 is equipped with a rotational conveying mechanism 27, an operating mechanism (not shown), and a variable-speed reciprocating driving mechanism 28. The rotational conveying mechanism 27 rotationally conveys numerous full-bag holding members (in FIG. 4, full bags $W_1$ are shown instead of the full-bag holding members) disposed at equal intervals on an endless conveyor chain in one direction along a ring-form track that has a pair of parallel sections (driving in this case is accomplished by means of a variable-speed driving motor $M_4$). The operating mechanism (that includes the full-bag holding member release device) performs raising and lowering and opening and closing of the full-bag holding members as these members are rotationally conveyed. The variable-speed reciprocating driving mechanism 28 causes a reciprocating movement of the rotational conveying mechanism 27 as a whole through a specified distance along the parallel sections (driving in this case is accomplished by a variable-speed driving motor $M_5$).

The retainer conveying device 26 is disposed on the first side of the parallel sections (the bag entry side C) and continuously conveys numerous retainers R at equal intervals and at a constant speed along the parallel section. The full-bag holding member release device and product-conveying conveyor 9 are respectively disposed on the second side of the parallel sections (i.e., on the bag exit side D).

The full-bag holding members moving along the bag entry side C successively extract full bags $W_1$ from the respective retainers R, and the full-bag holding members moving along the bag exit side D are operated on by the full-bag holding member release device and discharge full bags $W_1$ onto the product-conveying conveyor 9. The attachment pitch of the full-bag holding members on the conveyor chain of the rotational conveying mechanism 27 is set equal to the conveying pitch of the retainers R.

In the full-bag holding member conveying device 25, the rotational conveying mechanism 27 rotationally conveys the full-bag holding members by the variable-speed driving motor $M_4$, and the rotational conveying mechanism 27 as a whole is caused to perform a reciprocating movement along the parallel sections by the variable-speed driving motor $M_5$. Meanwhile, the retainer conveying device 26 conveys retainers R at a constant speed ($V_0$) in the same direction as the conveying direction on the bag entry side C of the ring-form track by the driving motor $M_6$.

The rotational conveying speed of the full-bag holding members produced by the driving motor $M_4$ and the speed of the reciprocating movement of the rotational conveying mechanism 27 produced by the driving motor $M_5$ are set at different values during the advancing movement (movement in the conveying direction of the retainers R is designated as the advancing movement; this movement being from the solid line toward the two-dot chain line in FIG. 4) and return movement (movement from the two-dot chain line toward the solid line). In this case, on the bag exit side D, the rotational conveying speed ($U_1$) of the full-bag holding members produced by the driving motor $M_4$ during the advancing movement and the speed of the advancing movement ($U_3$) of the rotational conveying mechanism 27 produced by the driving motor $M_5$ are synthesized (mutually canceled), and the moving speed of the full-bag holding members becomes zero. Furthermore, on the bag entry side C, the rotational conveying speed of the full-bag holding members ($U_1$ during advancing movement, and $U_2$ during return movement) produced by the driving motor $M_4$ during reciprocating movement and the reciprocating movement speed of the rotational conveying mechanism 27 ($U_3$ during advancing movement, and $U_4$ during return movement) produced by the driving motor $M_5$ are synthesized, and the moving speed of the full-bag holding members is set so as to be always the same as the conveying speed of the retainers R.

As a result of the speeds being set as described above, fill bags $W_1$ are continuously supplied from the retainers R to full-bag holding members that are moving at the same speed as the retainers on the bag entry side C; and on the bag exit side D, the full-bag holding member release device acts on the full-bag holding members at a synthesized speed of zero (i.e., in a stopped state) during the advancing movement of the rotational conveying mechanism 27, so that full bags $W_1$ are discharged onto the product-conveying conveyor 9. Since full bags $W_1$ are discharged from a plurality of full-bag holding members at one time on the bag exit side D, the working efficiency of the discharge device 10 is improved, and full bags $W_1$ can be discharged onto the product-conveying conveyor 9 in a state in which a plurality of full bags $W_1$ are arranged in a row.

The driving conditions, etc. of the respective driving devices in this discharge device 10 are set in the same manner as in the continuous bag supply device 2.

Next, the continuous bag supply device 2 will be described more concretely with reference to FIGS. 5 through 14.

As shown in FIGS. 5 through 8, the empty-bag holding member conveying device 21 which forms a part of the above-described continuous bag supply device 2 comprises a reciprocating driving mechanism 24, which is installed on a bed 31, and a rotational conveying mechanism 23, which is installed on this reciprocating driving mechanism 24 and rotationally conveys numerous empty-bag holding members 32 along a ring-form track that has a pair of parallel sections.

The reciprocating driving mechanism 24 comprises: slide members 35 through 38 which are installed on the undersurfaces of frames 33 and 34; rails 39 through 42 which are fastened to the bed 31 so that the slide members 35 through 38 are slidable along the surfaces thereof; bearings 43 and 44 which are fastened to the bed 31, a screw shaft 45 which is rotatably supported on these bearings; a variable-speed driving motor (servo motor) $M_2$ which rotationally drives the screw shaft 45; a nut member 46 which is fastened to the undersurface of the frame 33 and engages with the screw shaft 45; and supporting frames 47 and 48 which support the rotational conveying mechanism 23. By driving the driving motor $M_2$ in the forward and reverse directions, the reciprocating driving mechanism 24 can cause the rotational conveying mechanism 23 to perform a reciprocating movement to the left and right.

Figure 13:
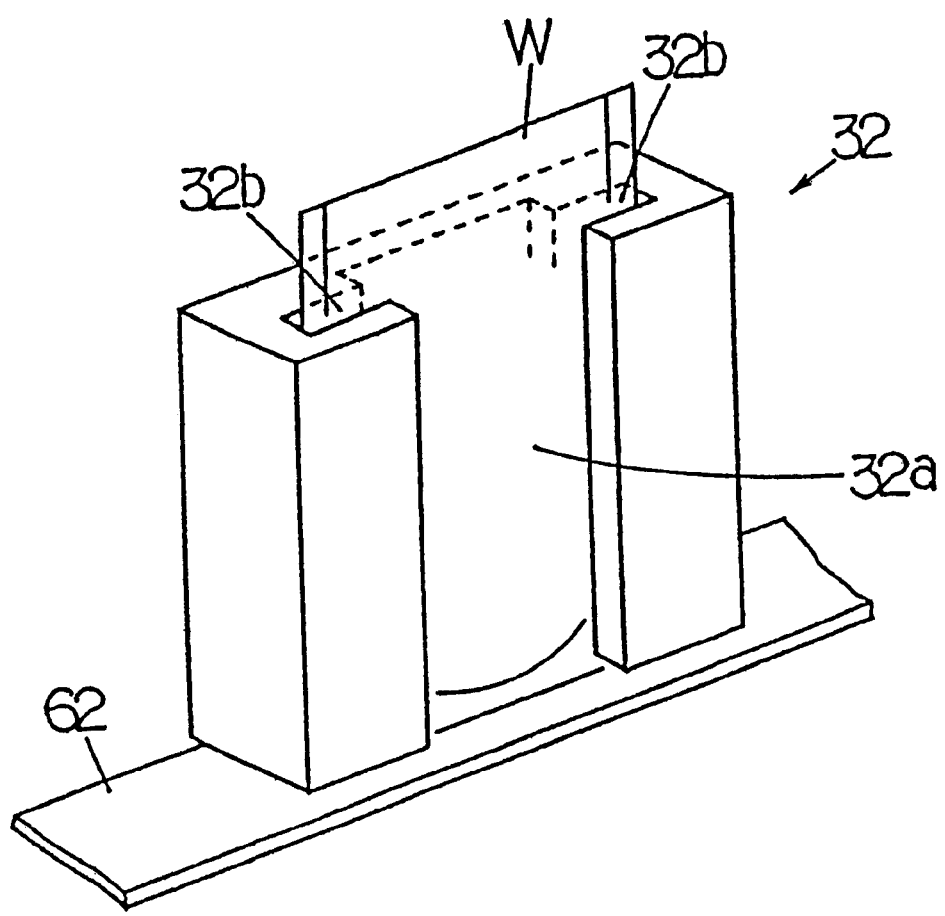
FIG. 13 is a diagram which illustrates the structure of the empty-bag holding members.
Figure 14:
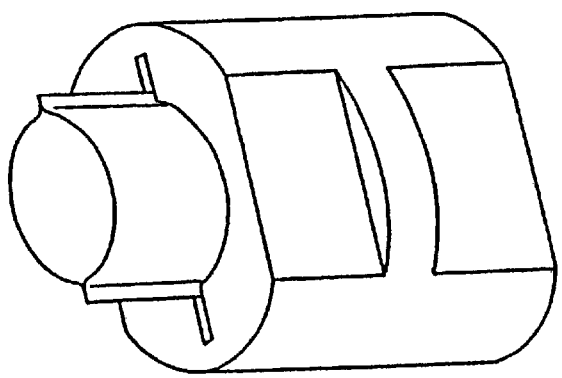
FIG. 14(a) shows the structure of the retainers.
FIG. 14(b) shows the empty bag W inserted into the retainer.
FIG. 14(c) shows the opening process of the bag in the retainer.
Figure 14:
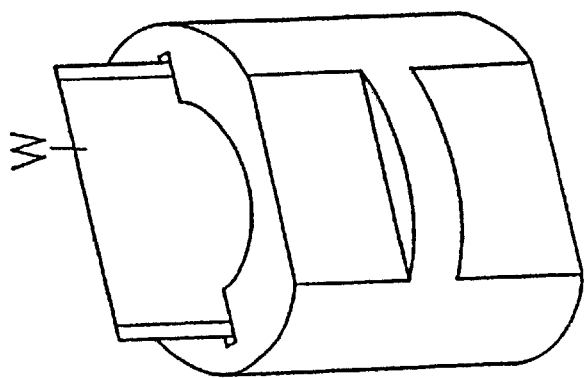
Figure 14:
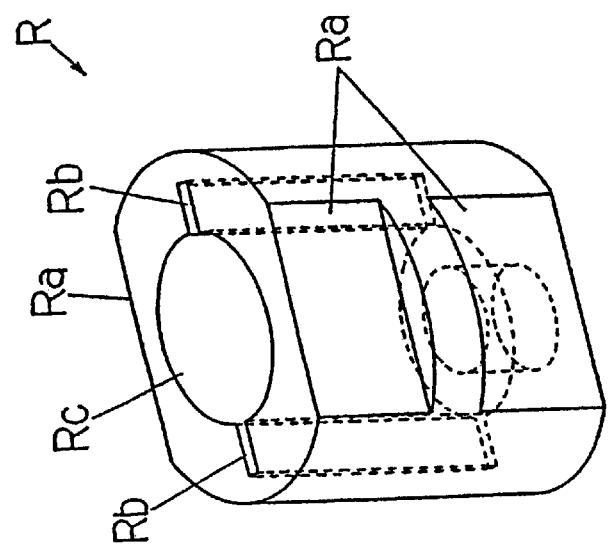

The rotational conveying mechanism 23 is equipped with: pivot shafts 51 and 52 which are rotatably supported on a main frame 49; sprockets 53 through 56 which are fastened to these pivot shafts 51 and 52; an upper conveyor chain 57 which is mounted between the upper sprockets 53 and 55; and a lower conveyor chain 58 which is mounted between the lower sprockets 54 and 56. Empty-bag holding members 32 are attached to these upper and lower conveyor chains 57 and 58 at equal intervals (pitch=p) via attachment members 59 so that the empty-bag holding members 32 face outward. As shown in FIG. 13, each of these empty-bag holding members 32 has a longitudinal groove 32a which opens on the front side; and longitudinally oriented slits 32b into which the empty bag W, particularly both side edge areas, is inserted are formed at an intermediate point in this longitudinal groove. Furthermore, the upper and lower conveyor chains 57 and 58 run while being guided on both sides by chain guides 61 respectively installed on the main frame 49 in the parallel sections.

This rotational conveying mechanism 23 has a variable-speed driving motor (servo motor) $M_1$. The driving force of this motor is transmitted to the pivot shaft 51 via gears, and the conveyor chains 57 and 58 are caused to rotate via the sprockets 53 through 56, so that the empty-bag holding members 32 are rotationally conveyed along the ring-form track.

In addition, a bag-receiving stand 62 is installed along the ring-form track of the empty-bag holding members 32 around the periphery of the main frame 49 leading from the bag entry side A to the bag exit side B. This bag-receiving stand 62 is used in order to prevent the empty bags W accommodated in the slits 32b of the empty-bag holding members 32 from dropping out at an intermediate point. A groove 62a which allows the empty bags W to drop out from an intermediate point is formed on the bag exit side B, and an insertion guide 63 which guides the empty bags W into the grooves of the retainers R (which are conveyed underneath at a constant speed) is attached to the undersurface of the above-described groove 62a. As shown, for example, in FIG. 14, the retainers R have parallel sections Ra on their outer walls; and inside thereof, the retainers R further have grooves Rb into which the empty bags are inserted and bottom-equipped retaining holes Rc with substantially circular cross-sectional shapes which accommodate the body portions of the bags when the bags are opened.

Figure 9:
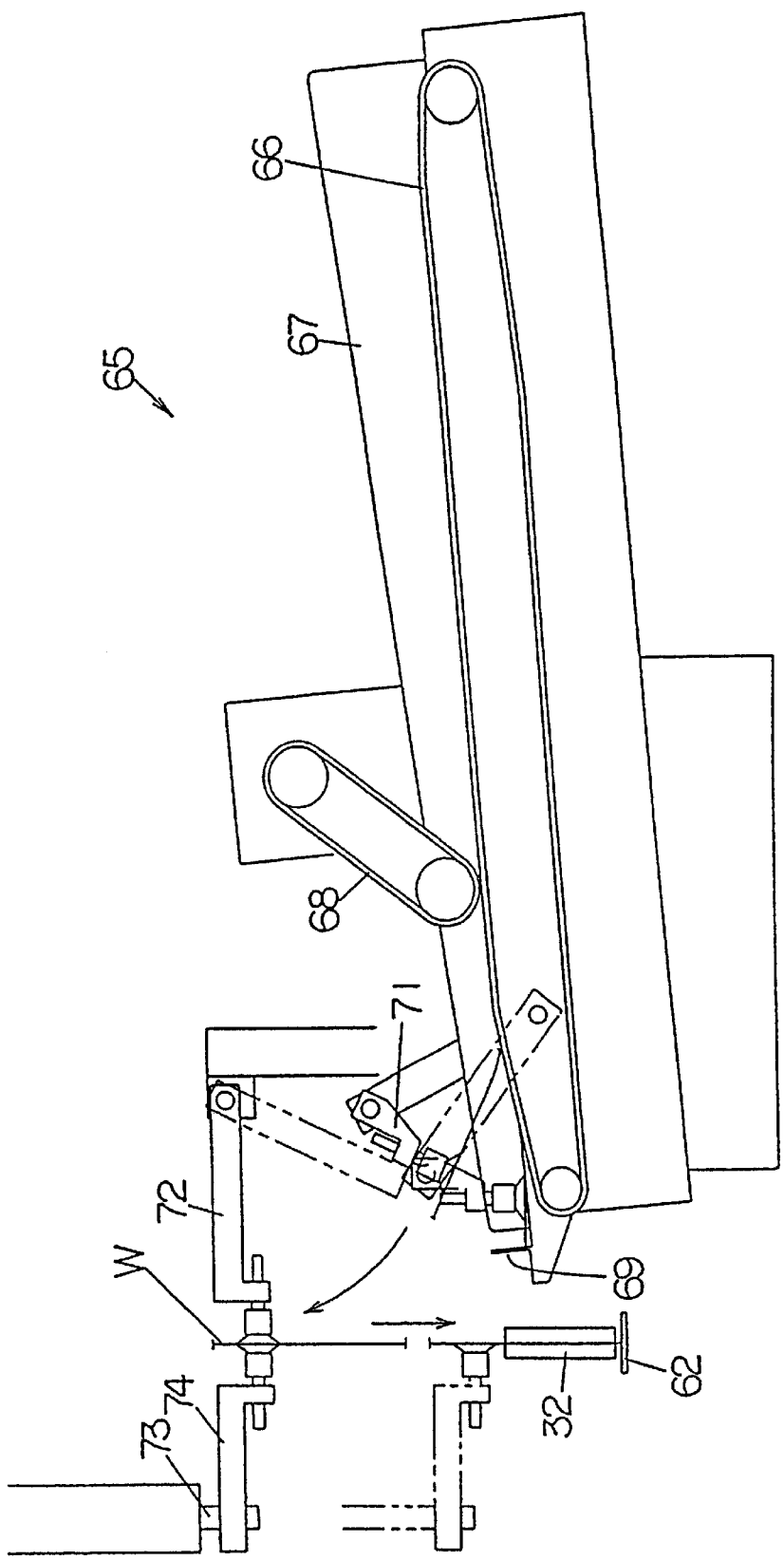
FIG. 9 is a side view of the intermittent empty bag supply device.

As shown in FIG. 9, the intermittent bag supply device 65 which forms a part of the continuous bag supply device 2 utilizes a conveyor magazine type bag supply device similar to that described in, for example, Japanese Patent Application Laid-Open (Kokai) No. H8-33721.

This intermittent bag supply device 65 is provided with: a belt conveyor 66 which continuously conveys numerous empty bags placed on the outside of the ring-form track of the empty-bag holding members 32 in a partially overlapped state with the bag mouths facing forward and downward, guide plates 67 which are disposed on the left and right, and which guide both side edges of the empty bags, a fast-feed belt 68 which separates the leading empty bag conveyed by the belt conveyor 66 from the following empty bags and fast-feeds this leading empty bag forward, a vacuum-suction extraction arm 71 which vacuum-chucks each empty bag W that has stopped as a result of contacting a stopper 69 located in front, and lifts this bag by a specified distance, by means of a suction plate attached to the tip end of said vacuum-suction extraction arm 71, and a vacuum-suction swinging arm 72 which vacuum-chucks this empty bag W (by means of a suction plate attached to the tip end of said vacuum-suction swinging arm 72), pivots upward and carries the empty bag W to a point directly above one of the empty-bag holding members 32. Furthermore, a raising-and-lowering arm 74 which is raised and lowered by a raising-and-lowering shaft 73 is installed inside the ring-form track of the empty-bag holding members 32. By means of a suction plate attached to its tip end, this raising-and-lowering arm 74 receives the empty bag W, that has been brought to a position directly above the empty-bag holding member 32 by the vacuum-suction swinging arm 72, and lowers the empty bag W vertically downward, so that the empty bag W is inserted into the slits 32b of the empty-bag holding member 32.

A plurality of such intermittent bag supply devices 65 (n number of devices 65) are installed side by side on the bag entry side A, so that empty bags W can be simultaneously supplied to n empty-bag holding members 32.

Figure 10:
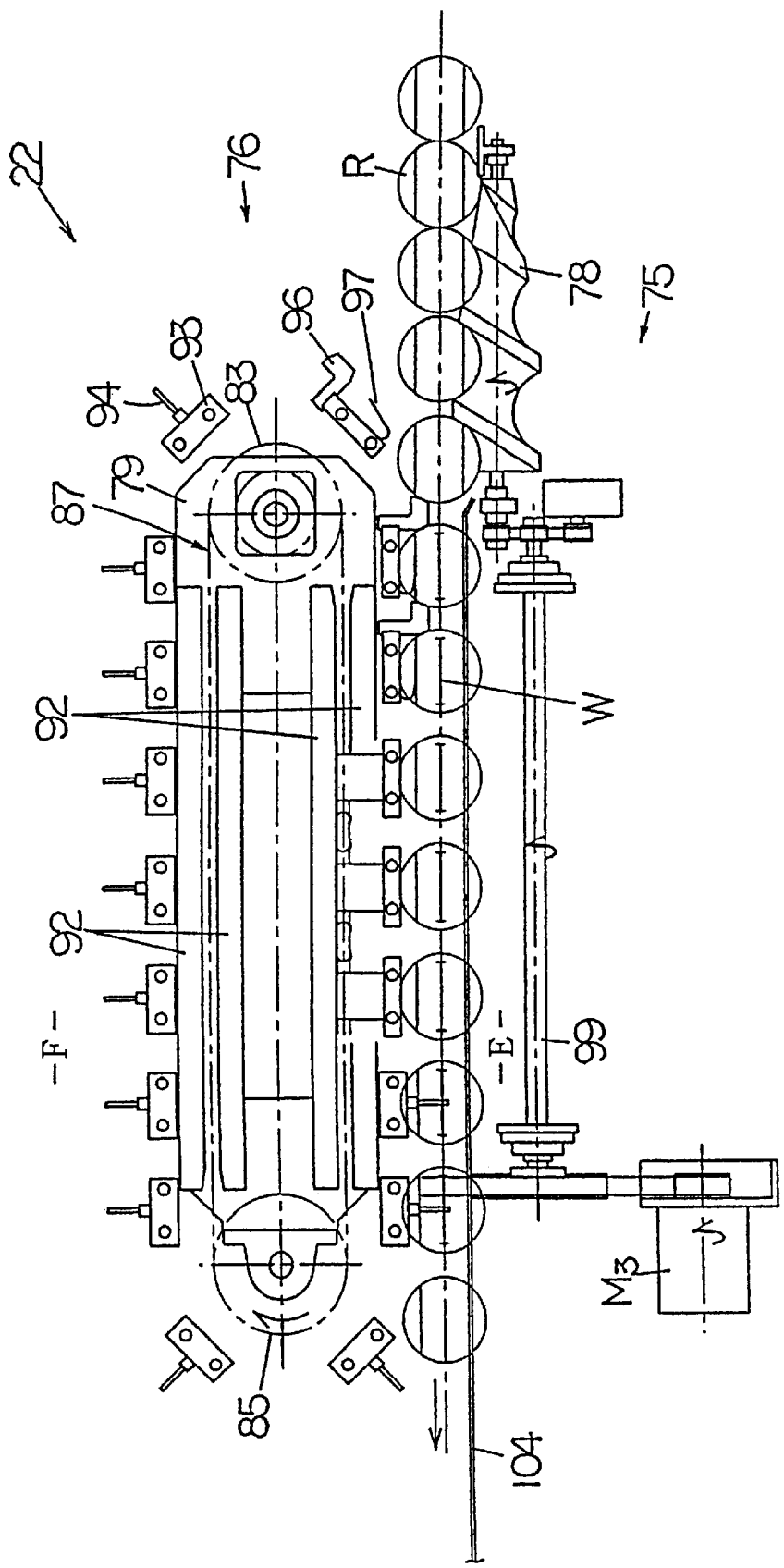
FIG. 10 is a plan view of the retainer conveying device.
Figure 11:
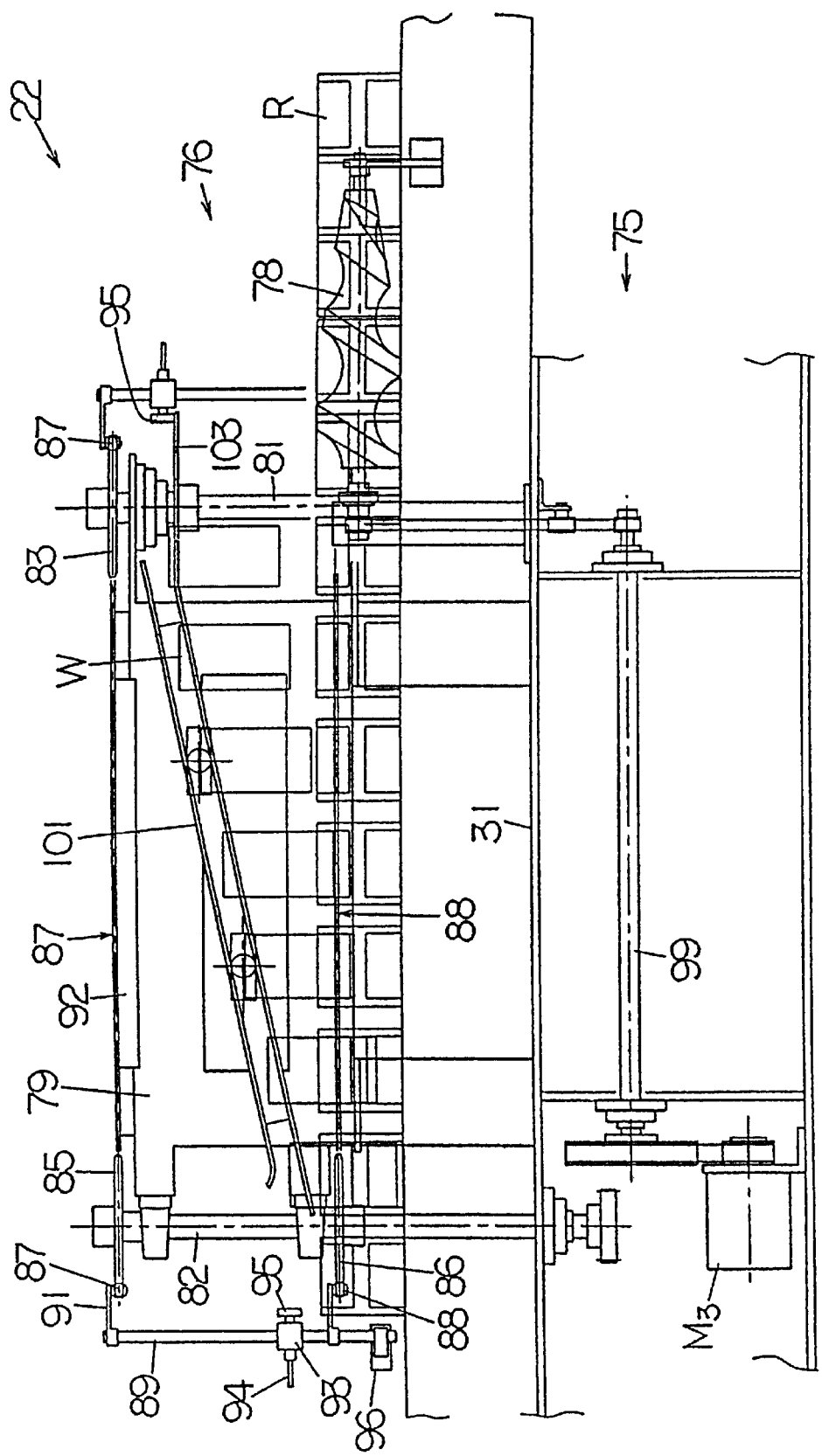
FIG. 11 is a side view thereof.
Figure 12:
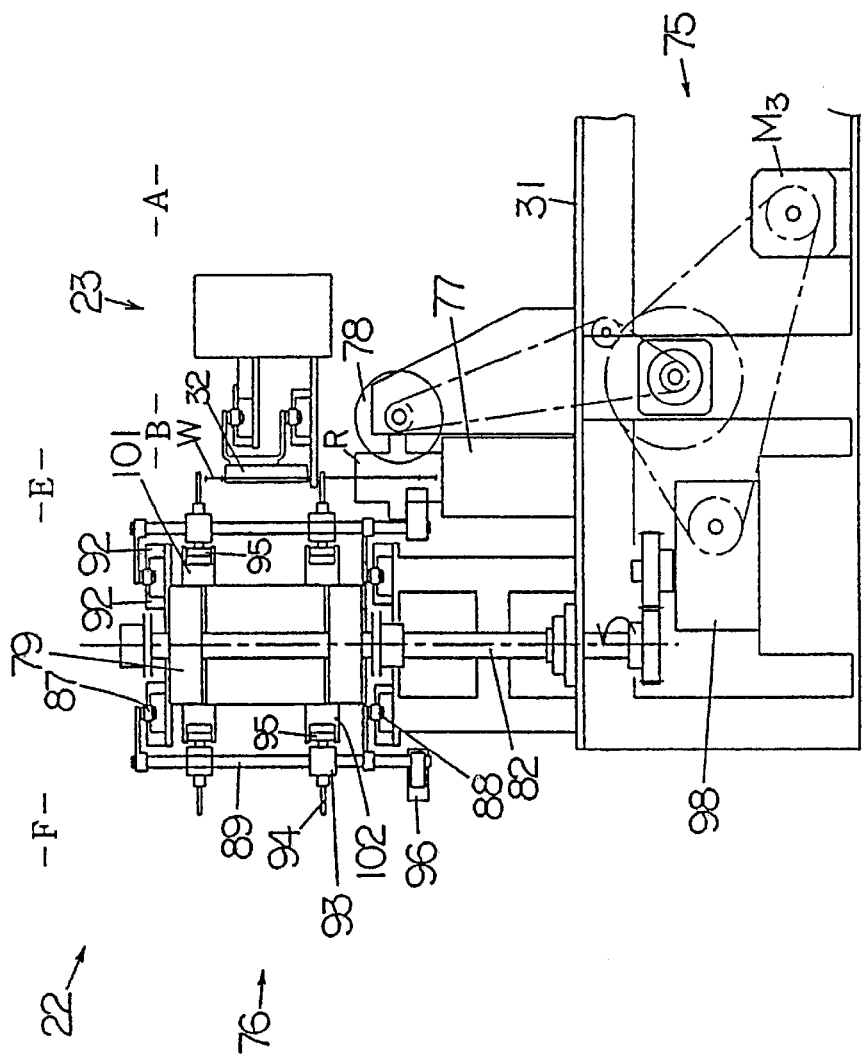
FIG. 12 is a front view thereof.

Furthermore, as shown in FIGS. 10 through 12, a bag insertion device is installed as an integral unit with the retainer conveying device 22.

The retainer conveying device 22 comprises, along with other components, a driving mechanism 75 which is installed in the lower part of the bed 31, a combination retainer conveying and bag insertion mechanism 76 which is installed on the bed 31, a retainer-conveying conveyor 77 which carries retainers R and conveys these retainers over the main conveying path 1, and a retainer introduction screw 78.

The combination retainer conveying and bag insertion mechanism 76 is provided with: pivot shafts 81 and 82 which are rotatably supported on a main frame 79, sprockets 83 through 86 (84 is omitted from the figures) which are fastened to the pivot shafts, an upper conveyor chain 87 which is mounted between the upper sprockets 83 and 85, and a lower conveyor chain 88 which is mounted between the lower sprockets 84 and 86. Raising-and-lowering member guide shafts 89 are attached to these upper and lower conveyor chains 87 and 88 at equal intervals (pitch=p) via attachment members 91 so that these guide shafts 89 face outward. In the parallel sections, the upper and lower conveyor chains 87 and 88 run while being guided on both sides by respective chain guides 92 installed on the main frame 79. Raising-and-lowering members 93 are slidably provided on the raising-and-lowering member guide shafts 89; and empty-bag insertion pins 94 are attached to the raising-and-lowering members 93 so as to face outward, and cam followers (rollers) 95 are attached to the raising-and-lowering members 93 so as to face inward. Furthermore, retainer spacing maintaining members 96 and plate springs 97 are attached to the lower ends of the raising-and-lowering member guide shafts 89.

The driving mechanism 75 of this retainer conveying device 22 has a driving motor (servo motor) $M_3$; and the driving force of this driving motor $M_3$ is transmitted to the pivot shaft 82 via a belt, pulley, speed reduction mechanism 98 and gears, etc., so that the conveyor chains 87 and 88 are rotated via the sprockets 83 through 86. As a result, the raising-and-lowering member guide shafts 89 are rotationally conveyed along a ring-form track that has a pair of parallel sections. The driving force of the driving motor $M_3$ is transmitted to the retainer introduction screw 78 via a belt, pulley and transmission shaft 99, etc.

In the combination retainer conveying and bag insertion mechanism 76, raisin-and-lowering member raising-and-lowering cams 101 and 102 are installed at an inclination along both parallel sections of the ring-form track of the raising-and-lowering member guide shafts 89, and the cam followers 95 run on these cams. Furthermore, a cam plate 103 is attached to the pivot shaft 81 (positioned on the retainer entry side) at a height that connects with upper ends of the raising-and-lowering member raising-and-lowering cams 101 and 102, and the cam followers 95 ride on this cam plate 103.

Furthermore, when the conveyor chains 87 and 88 are rotated by the driving motor $M_3$ so that the raising-and-lowering member guide shafts 89 perform a rotational movement at a constant speed, the cam followers 95 are moved along the raising-and-lowering member raising-and-lowering cams 101 and 102. As a result, on the retainer side E of the parallel sections, the raising-and-lowering members 93 are gradually lowered; and on the parallel section F on the opposite side, these raising-and-lowering members 93 are gradually raised. The height of this rising and falling action is set so that the tip ends of the empty-bag insertion pins 94 attached to the raising-and-lowering members 93 are positioned directly above the empty bags W held in the empty-bag holding members 32 on the high end of the retainer side E and so that the empty bags W can be extracted from the empty-bag holding members 32 and inserted into the retainers R located underneath on the low end of the retainer side E.

The combination retainer conveying and bag insertion mechanism 76 also serves to convey the retainers R (that have been placed on the retainer-conveying conveyor 77 and conveyed to the combination retainer conveying and bag insertion mechanism 76) at a constant conveying speed ($V_0$) and spacing (p) directly beneath the empty-bag holding members 32 located on the retainer side B. In other words, the conveying speed and spacing of the retainers R on the retainer-conveying conveyor 77 are first adjusted by means of the retainer introduction screw 78 and are then adjusted to a constant conveying speed ($V_0$) and spacing (p) by the retainer spacing maintaining members 96 which move at a constant speed together with the raising-and-lowering member guide shafts 89. When the retainers R are being conveyed, the parallel surfaces Ra are pressed against a retainer conveying guide 104 by the plate springs 97. As a result, the retainers R are positioned so that the positions of the bag insertion grooves Rb of the conveyed retainers R and the positions of the longitudinally oriented slits 32b of the empty-bag holding members 32 are aligned vertically.

The overall operation of the continuous bag supply device and the retainer conveying device described above will again be described briefly.

The empty-bag holding member conveying device 21 first operates as described earlier with reference to FIG. 2, so that the empty-bag holding members 32 are reduced to a moving speed of zero (i.e., are in a stopped state) during the advancing movement of the rotational conveying mechanism 23 on the bag entry side A. During this time, the intermittent bag supply device 65 inserts empty bags W into the slits 32b of a plurality of empty-bag holding members 32 (i.e., n empty-bag holding members 32). In other words, empty bags W are supplied to the empty-bag holding members 32. Then, in a state in which the lower ends of the empty bags W are supported on the bag-receiving stand 62, the empty bags W are caused to move together with the empty-bag holding members 32 by the rotational conveying mechanism 23. Meanwhile, on the bag exit side B, the empty-bag holding members 32 are moved at a constant speed ($V_0$); and the retainers R underneath the empty-bag holding members 32 are conveyed at the same conveying speed ($V_0$) and the same conveying pitch (p) as the empty-bag holding members 32 by the retainer conveying device 22, and they are further conveyed in a state in which these retainers R are aligned with the empty-bag holding members 32 in the vertical direction.

When the empty-bag holding members 32 arrive at the position of the groove 62a in the bag-receiving stand 62 on the bag exit side B, the empty-bag insertion pins 94 begin to drop in the retainer conveying device 22, so that the empty bags W accommodated in the slits 32b of the empty-bag holding members 32 are pushed from above and extracted below; and these empty bags W are then inserted via the insertion guide 63 into the grooves Rb of the retainers R being conveyed underneath. In other words, the empty bags W are extracted from the empty-bag holding members 32 and supplied to the retainers R.

Next, the discharge device 10 in the present invention will be described more concretely with reference to FIGS. 15 through 17.

Figure 15:
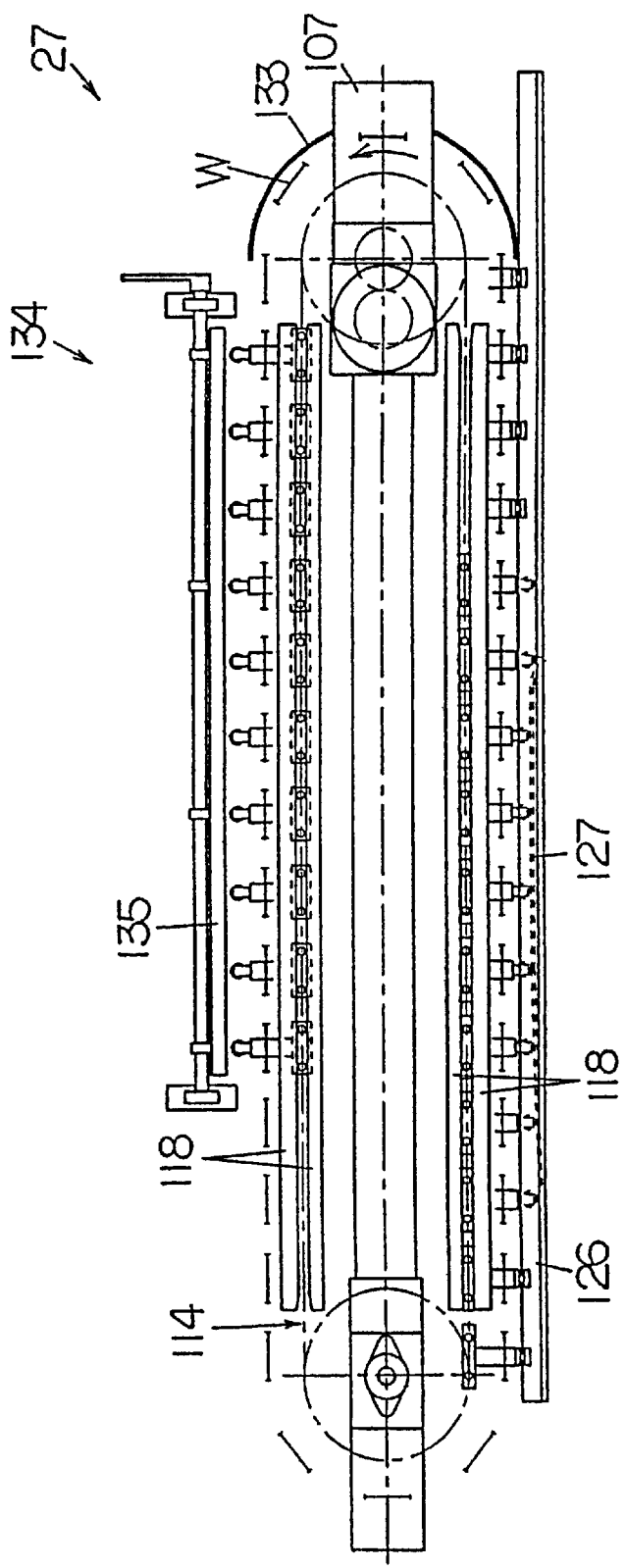
FIG. 15 is a plan view of the full-bag holding member conveying device.
Figure 16:
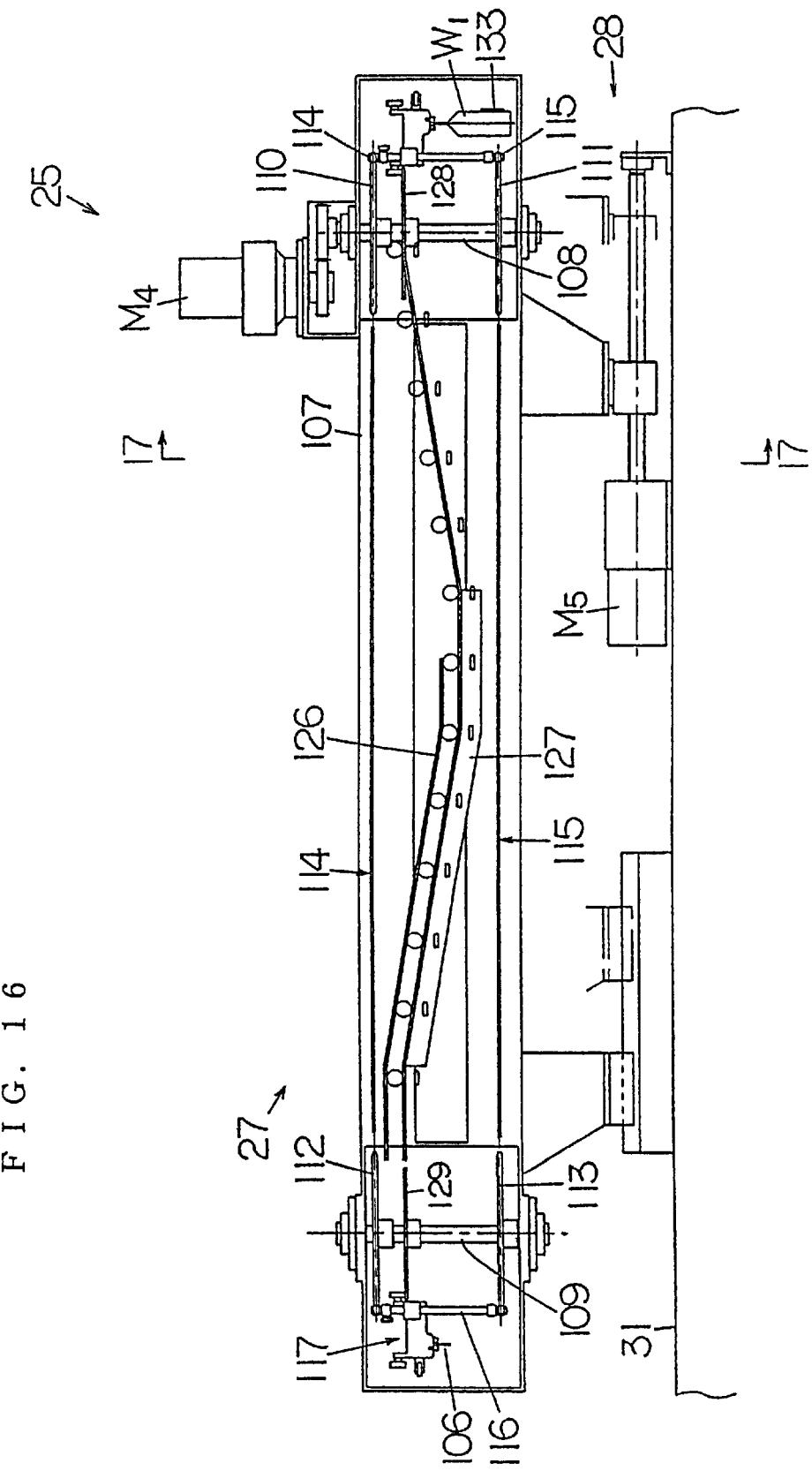
FIG. 16 is a side view thereof.
Figure 17:
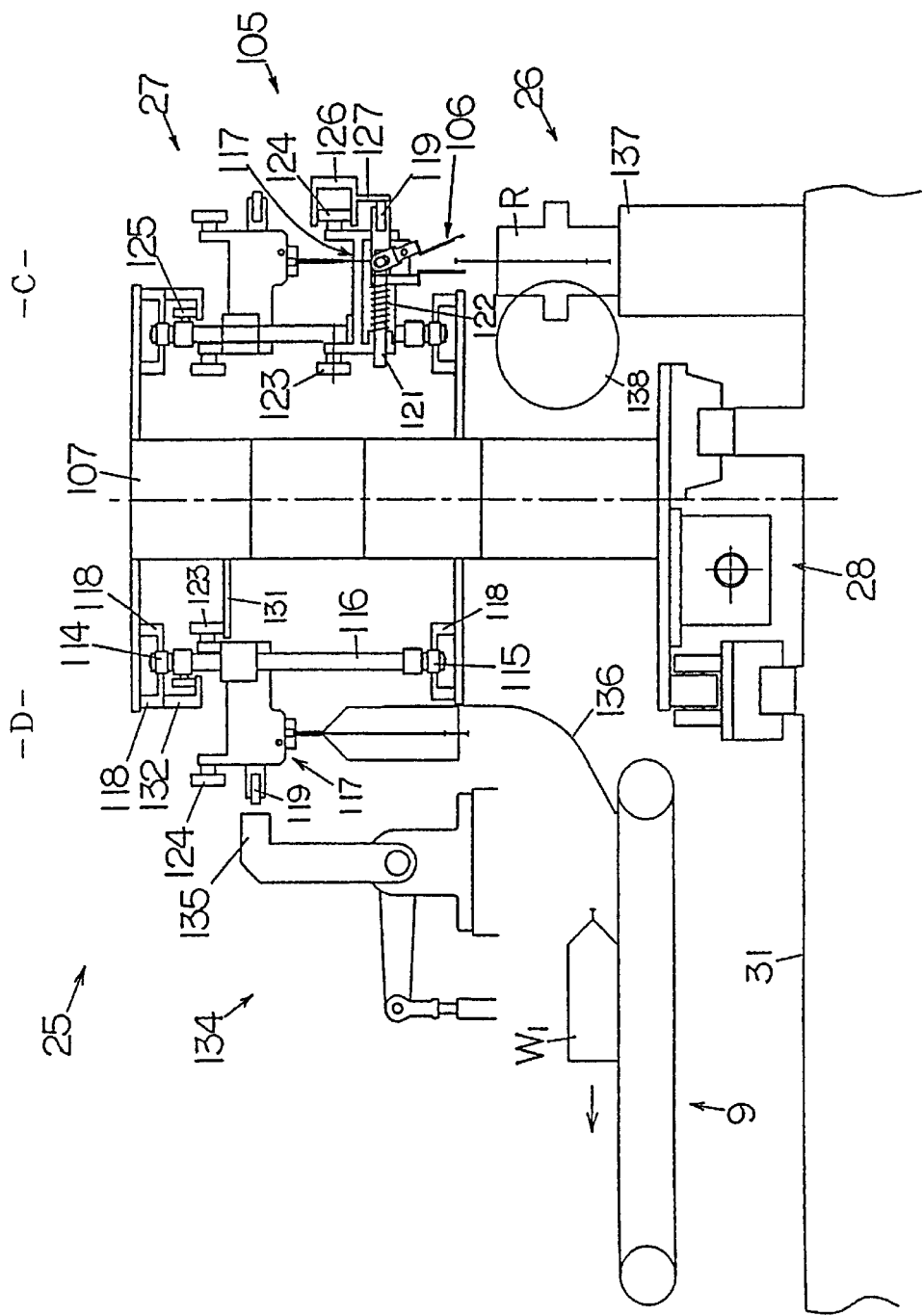
FIG. 17 is a sectional arrow view taken along the line 17—17 in FIG. 16.

As shown in FIGS. 15 through 17, the full-bag holding member conveying device 25 which forms a part of this discharge device 10 comprises: a reciprocating driving mechanism 28 which is installed on a bed 31, a rotational conveying mechanism 27 which is installed on this reciprocating driving mechanism 28 and rotationally conveys numerous full-bag holding members 106 along a ring-form track that has a pair of parallel sections, and an operating mechanism 105 which performs raising and lowering and opening and closing of the full-bag holding members 106 as the full-bag holding members 106 are rotationally conveyed.

Figure 6:
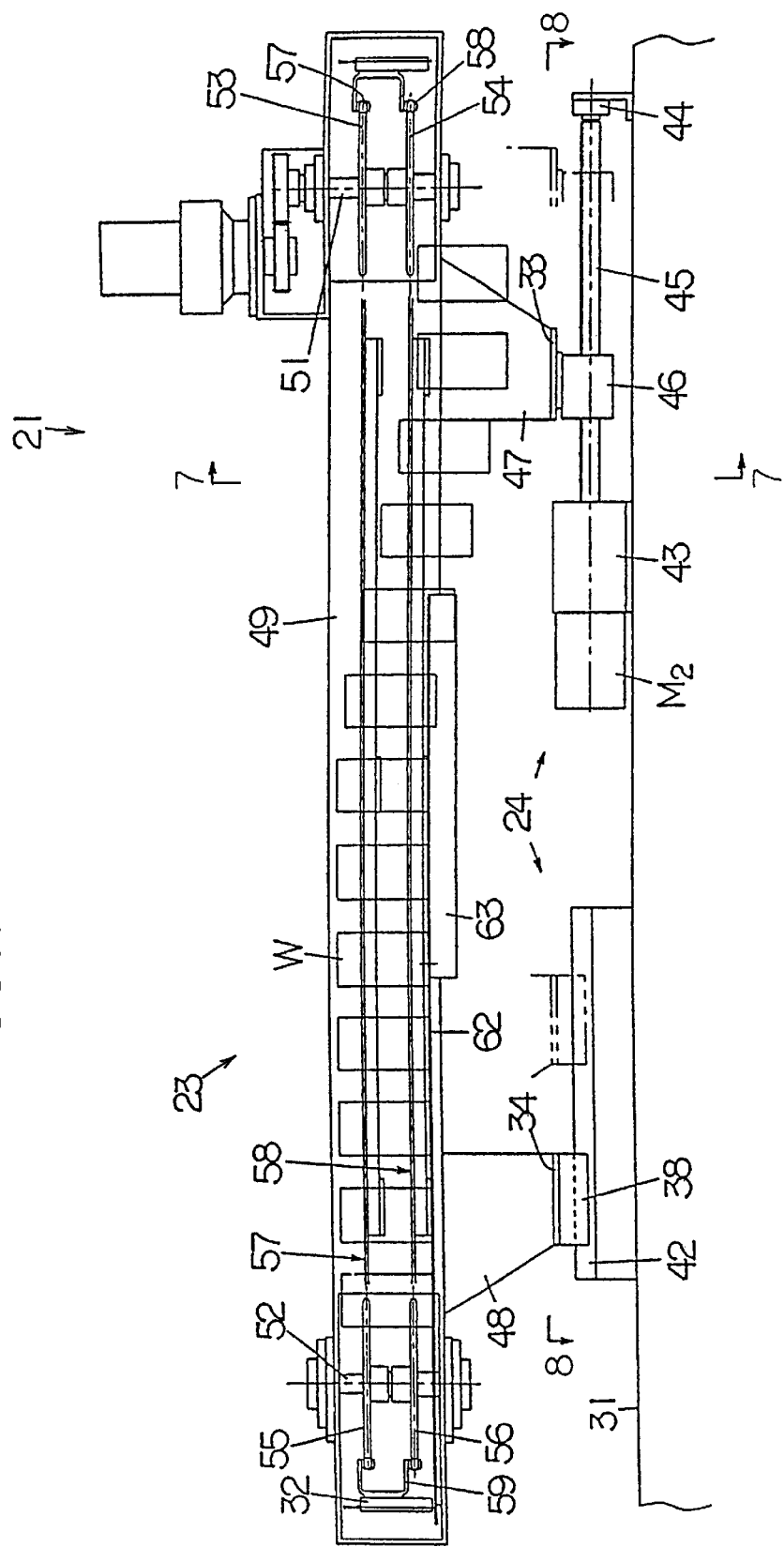
FIG. 6 is a side view thereof.
Figure 7:
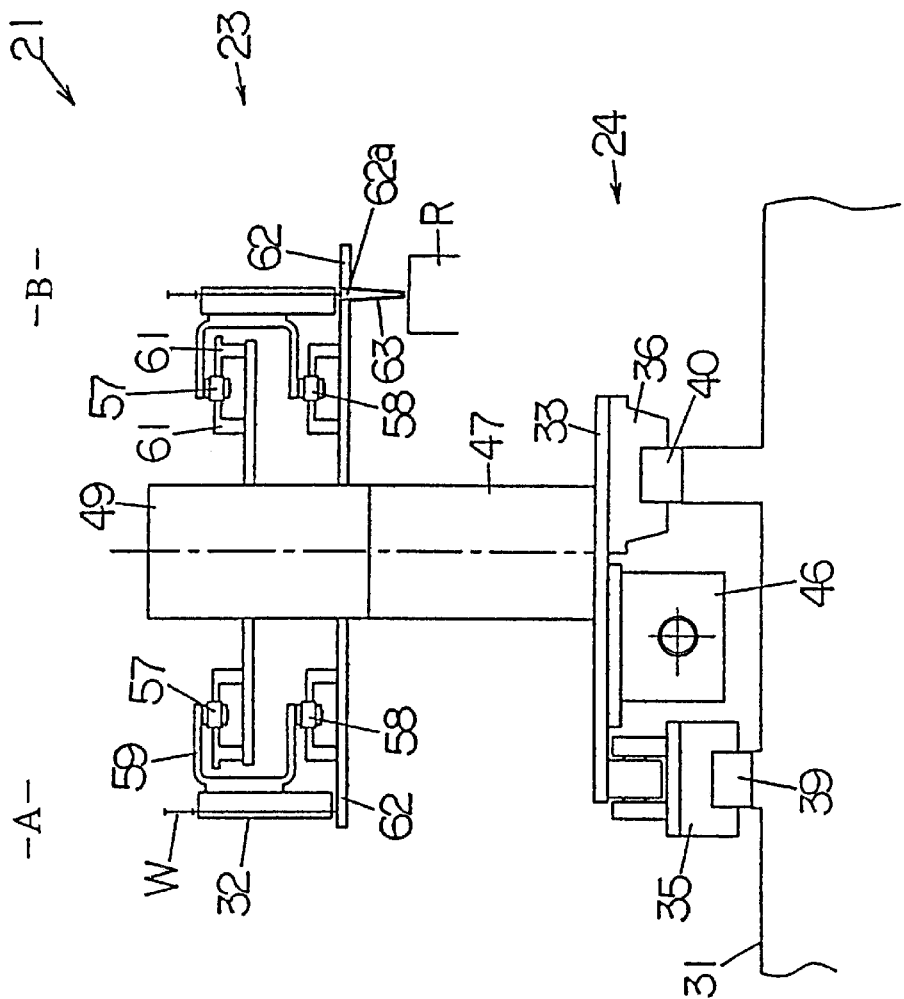
FIG. 7 is a sectional arrow view taken along the line 7—7 in FIG. 6.
Figure 8:
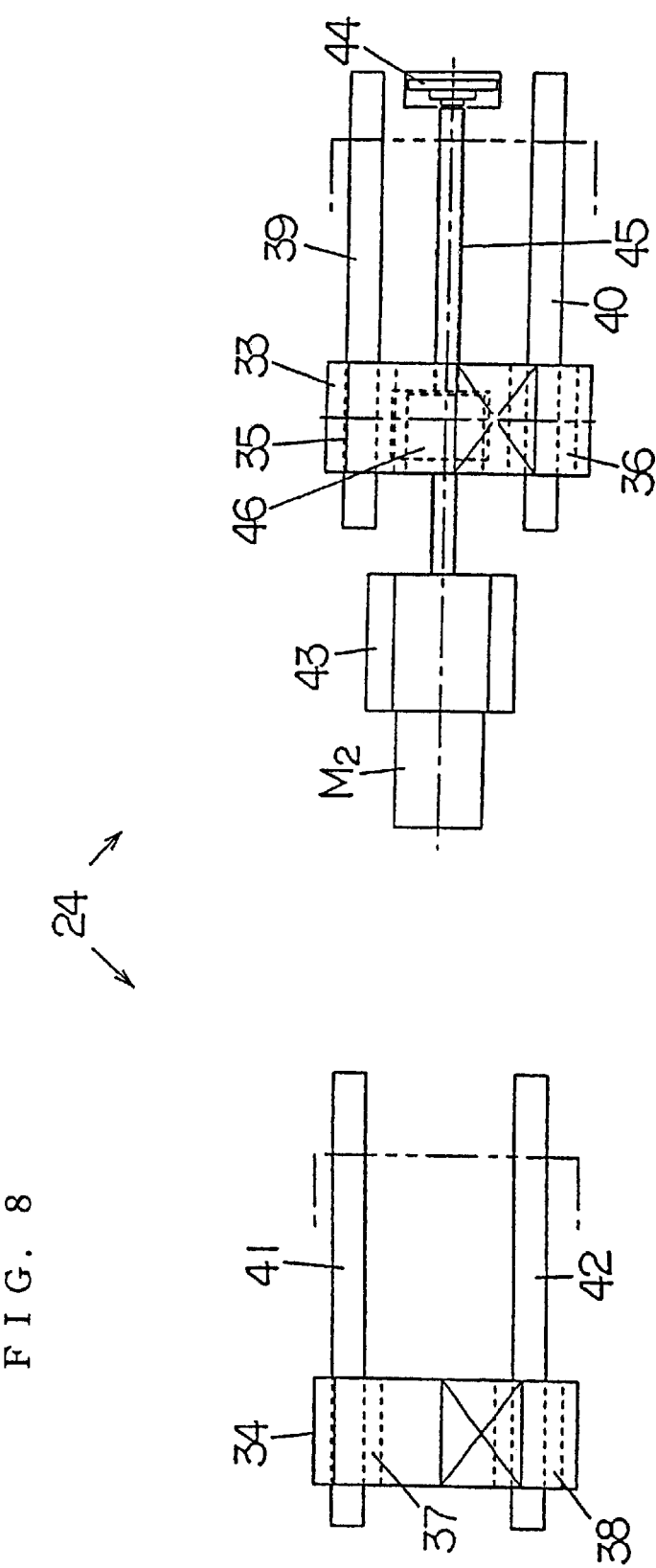
FIG. 8 is a sectional arrow view taken along the line 8—8 in FIG. 6.

The reciprocating driving mechanism 28 has the same structure as the reciprocating driving mechanism 24 illustrated in FIGS. 6 through 8. It can cause the rotational conveying mechanism 27 to perform a reciprocating movement to the left and right by driving the driving motor (servo motor) $M_5$ in the forward and reverse directions.

The rotational conveying mechanism 27 is also substantially the same as the rotational conveying mechanism 23. The rotational conveying mechanism 27 is equipped with: pivot shafts 108 and 109 which are supported on a main frame 107, sprockets 110 through 113 which are fastened to the pivot shafts 108 and 109, an upper conveyor chain 114 which is mounted between the upper sprockets 110 and 112, and a lower conveyor chain 115 which is mounted between the lower sprockets 111 and 113. Raising-and-lowering guide shafts 116 are attached at equal intervals (pitch=p) to these upper and lower conveyor chains 114 and 115, and raising-and-lowering cases 117 are attached to these raising-and-lowering guide shafts 116 so as to be freely raised and lowered. The upper and lower conveyor chains 114 and 115 are guided from both sides by chain guides 118 respectively installed on the main frame 107 in the parallel sections.

Full-bag holding members 106 are provided on the raising-and-lowering cases 117 so that the full-bag holding members face downward. Also provided on the raising-and-lowering cases 117 are: opening-and-closing rods 121 which are equipped with cam followers (rollers) 119 on their outward-facing end portions and open and close the full-bag holding members 106 by sliding inward and outward, compression springs 122 which are fitted over the opening-and-closing rods 121 and constantly drive the full-bag holding members 106 in the closing direction, and cam followers (rollers) 123 and 124 which are attached to the inward-facing end portions and outward-facing end portions of the raising-and-lowering cases 117. Meanwhile, cam followers (rollers) 125 which are attached to the upper portions of the raising-and-lowering guide shafts 116 so that these cam followers that face outward are also provided on the raising-and-lowering cases 117.

A full-bag holding member raising-and-lowering cam 126 and an opening-and-closing cam 127 are provided on the bag entry side C of the parallel sections of the ring-form track of the full-bag holding members 106. The respective cam followers 124 and 119 run on these cams so that the full-bag holding members 106 are raised and lowered or opened and closed. Furthermore, cam plates 128 and 129 are attached to the respective pivot shafts 108 and 109 at such a height that the raised positions of the full-bag holding members 106 can be maintained "as is". Moreover, a cam plate 131 is likewise attached on the bag exit side D of the parallel sections, and the cam followers 123 ride or run on this cam plate 131. Furthermore, a horizontal cam 132 which supports the weight of the raising-and-lowering guide shafts 116 and prevents sagging is installed around the upper periphery of the main frame 107, and the cam followers 125 fastened to the raising-and-lowering guide shafts 116 run on this horizontal cam 132.

In addition, a bag guide 133 which prevents shaking of the full bags $W_1$ is installed in the rotation area extending from the bag entry side C to the bag exit side D.

The above-described raising-and-lowering cases 117 and respective associated members 119, 121 through 124, as well as the cams 126 and 127 and cam plates 128, 129 and 131, constitute the main parts of the operating mechanism 105.

Furthermore, a full-bag holding member release device 134 which constitutes another main part of the operating mechanism 105 is installed on the bag exit side D of the parallel sections. A lever 135 advances toward or withdraws from the cam followers 119, and the full-bag holding members 106 are opened as a result of the tip end of this lever 135 pushing the cam followers 119. Furthermore, the product-conveying conveyor 9 which is a part of the discharge device 10 conveys the full bags $W_1$ (that slide down the chute 136) into the next process (e.g., packing in boxes) in a plurality of rows (n rows). Accordingly, this conveyor 9 is formed with a large width in order to allow the simultaneous dropping of a plurality of full bags $W_1$.

In FIGS. 15 through 17, the retainer conveying device 26 is omitted (in FIG. 17, only the positions of the retainer-conveying conveyor 137 and retainer introduction screw 138 are shown). However, the retainer conveying device 26 also has a structure substantially the same as that of the retainer conveying device 22 shown in FIGS. 9 through 11 (except that there is no need for the parts related to the insertion of empty bags). Furthermore, the retainer conveying device 26 serves to convey the retainers R (which have been carried and conveyed on the retainer-conveying conveyor 137) at a constant conveying speed ($V_0$) and spacing (p) directly beneath the full-bag holding members 106 located on the bag entry side C.

The overall operation of the above discharge device 10 and retainer conveying device 26 will again be briefly described.

The full-bag holding member conveying device 25 first operates as described previously with reference to FIG. 4, so that the full-bag holding members 106 are moved at a constant speed ($V_0$) on the bag entry side C. Beneath these full-bag holding members 106, the retainers R are conveyed by the retainer conveying device 26 at the same conveying speed ($V_0$) and conveying pitch (p) as the full-bag holding members 106 and in a state in which the retainers R are aligned with the full-bag holding members 106 in the vertical direction. Then, the full-bag holding members 106 that have been conveyed to the bag entry side C are gradually lowered as a result of the cam followers 124 running along the full-bag holding member raising-and-lowering cam 126; and at the same time, the cam followers 119 come into contact with the full-bag holding member opening-and-closing cam 127 so that the full-bag holding members 106 are opened. Then, at the lowest point, the cam followers 124 separate from the full-bag holding member opening-and-closing cam 127, so that the full-bag holding members 106 close and grip the upper portions of the full bags $W_1$ accommodated in the retainers R; and further, the full-bag holding members 106 rise and extract the full bags $W_1$ from the retainers R. In other words, the full-bag holding member conveying device 25 receives the full bags $W_1$ by the full-bag holding members 106.

Then, the cam followers 123 of the full-bag holding members 106 ride on the cam plate 128 and further run along the horizontal cam 131 on the bag exit side D; and during this period, the full-bag holding members 106 maintain a specified height. On this bag exit side D, the full-bag holding members 106 have a moving speed of zero (i.e., the full-bag holding members 106 are in a stopped state) during the advancing movement of the rotational conveying mechanism 27. During this period, the lever 135 of the full-bag holding member release device 134 advances and pushes the cam followers 119 inward with its tip end so that a plurality of full-bag holding members 106 (n full-bag holding members 106) are opened, and n full bags are caused to drop. In other words, full bags $W_1$ are discharged from the full-bag holding members 106 in n rows. Since the full-bag holding members 106 are in a stopped state relative to the product-conveying conveyor 9, and since a plurality of full bags $W_1$ drop at the same time, the plurality of full bags $W_1$ that drop onto the product-conveying conveyor 9 maintain a configuration of n rows.

Figure 18:
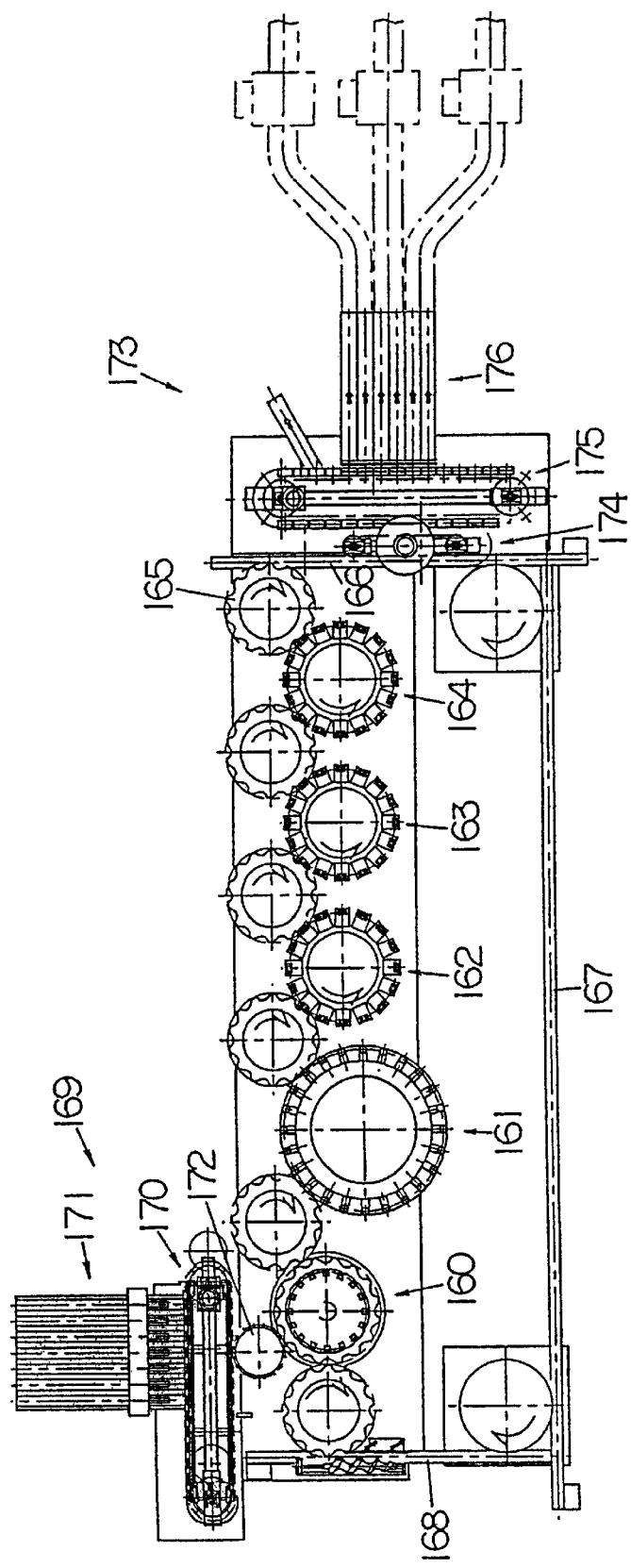
FIG. 18 is an overall schematic diagram of another retainer type continuous-filling packaging system according to the present invention.
Figure 19:
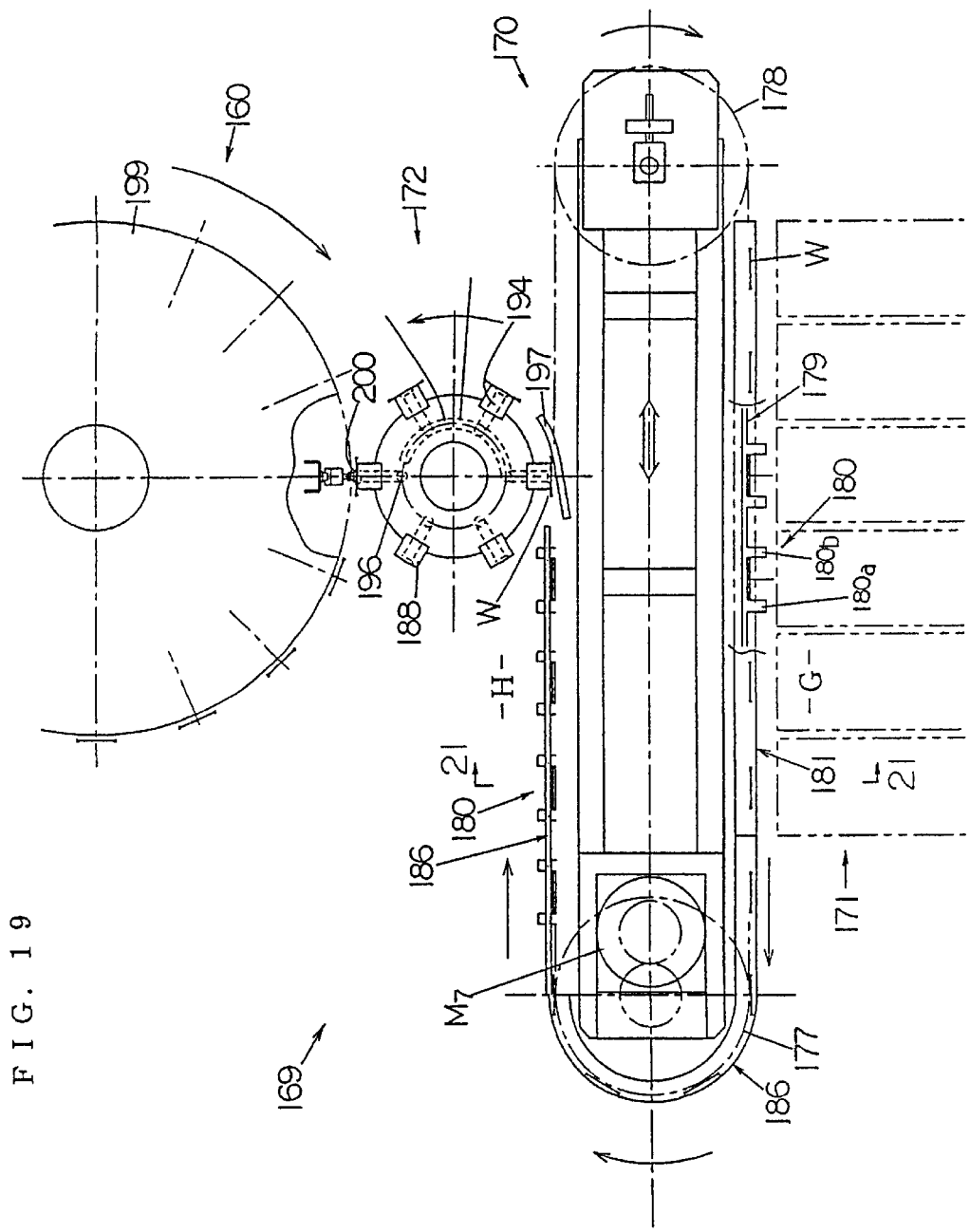
FIG. 19 is a plan view of the continuous bag supply device.
Figure 20:
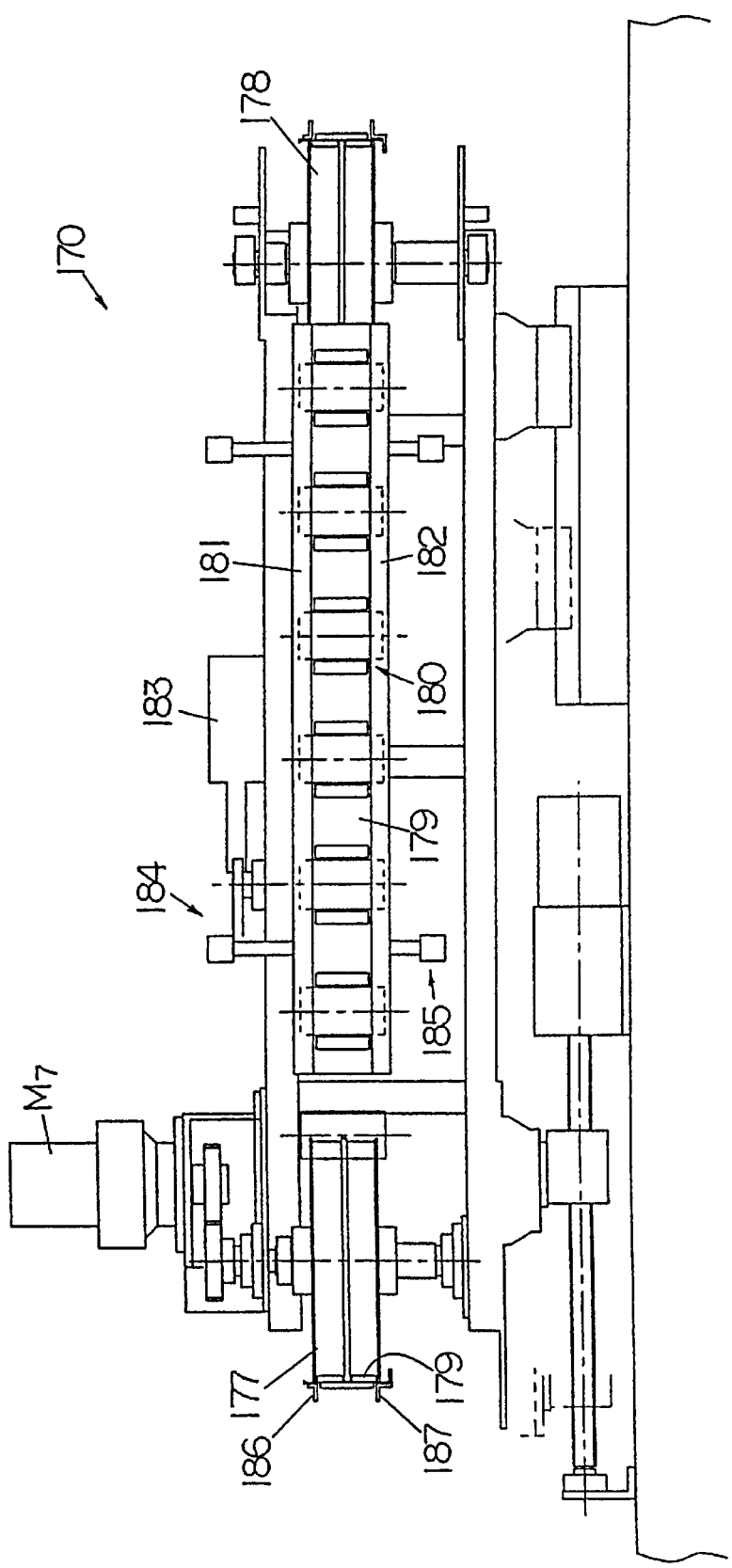
FIG. 20 is a side view of the empty-bag holding member conveying device.
Figure 21:
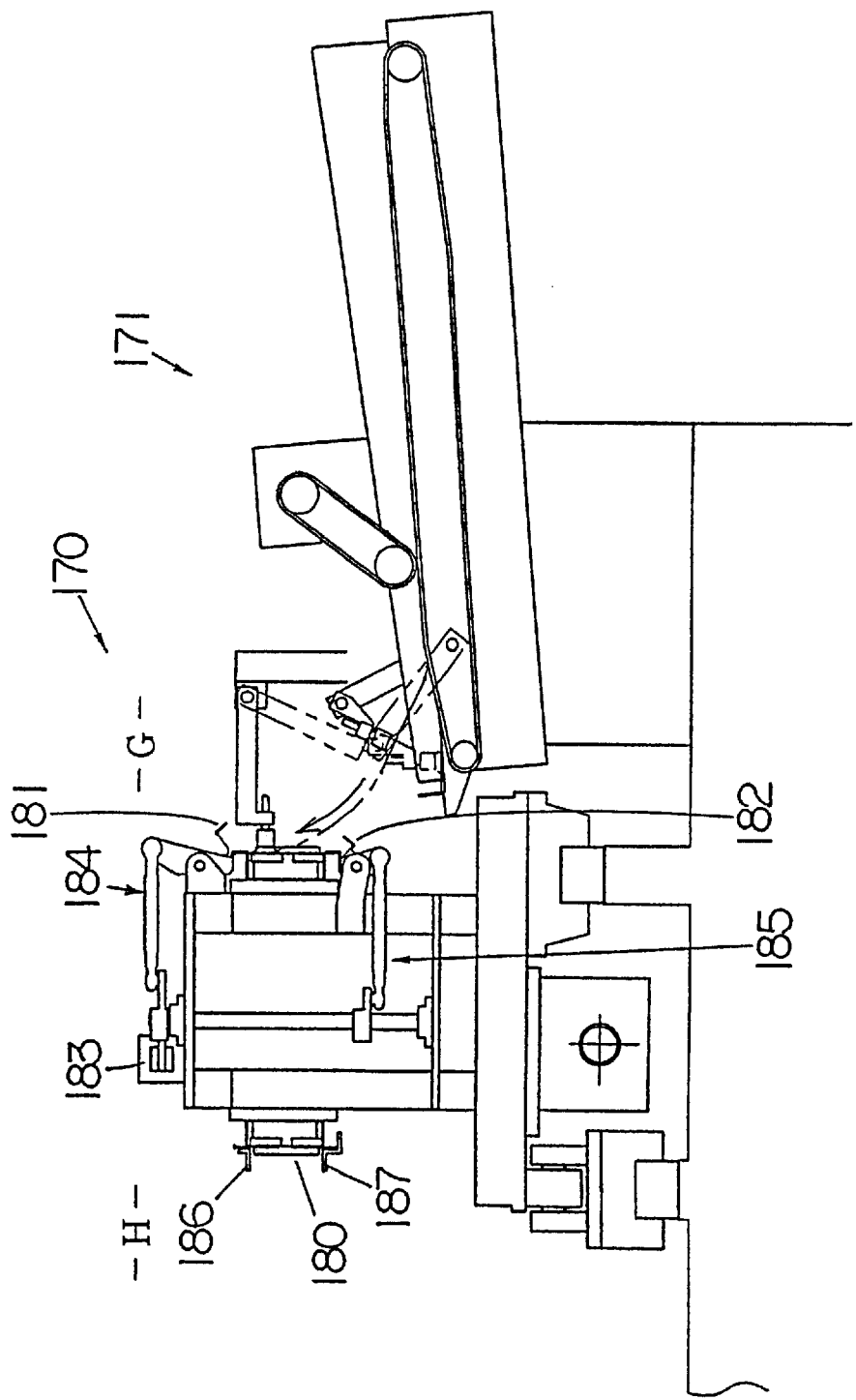
FIG. 21 is a sectional arrow view taken along the line 21—21 in FIG. 19.
Figure 22:
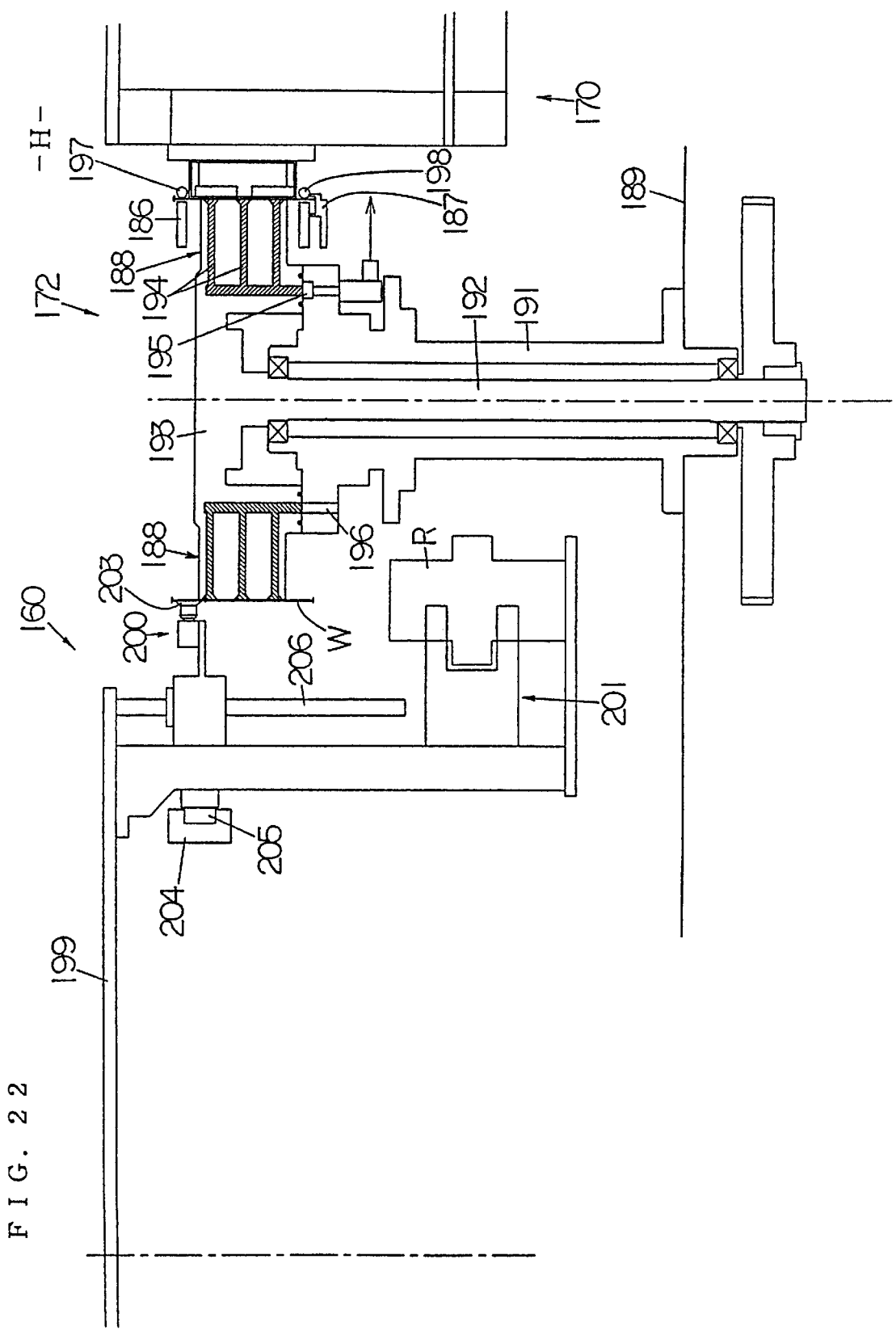
FIG. 22 is a sectional view of the rotary type transfer device of the continuous bag supply device.
Figure 23:
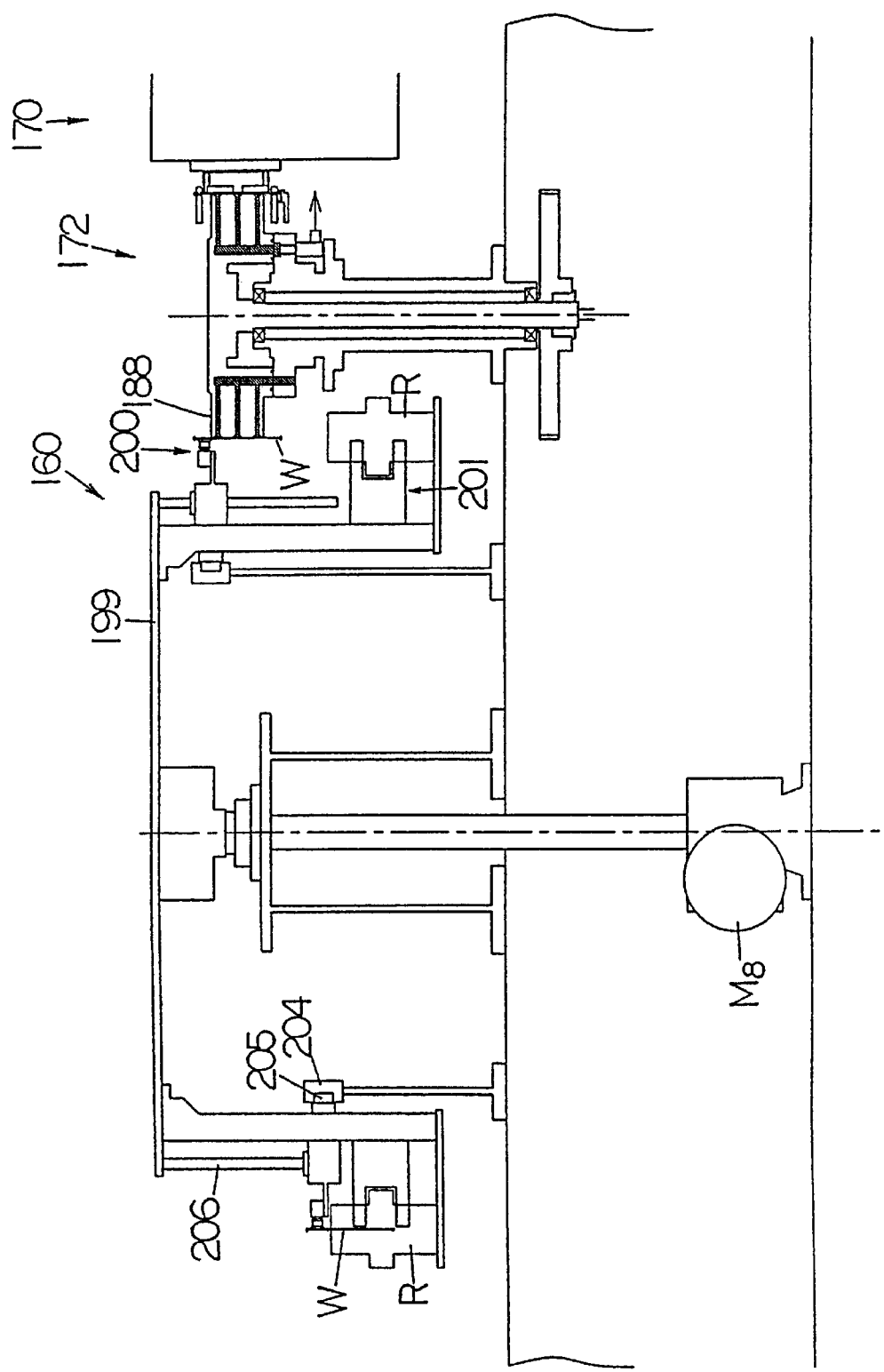
FIG. 23 is a sectional view of the insertion device and other elements.
Figure 24:
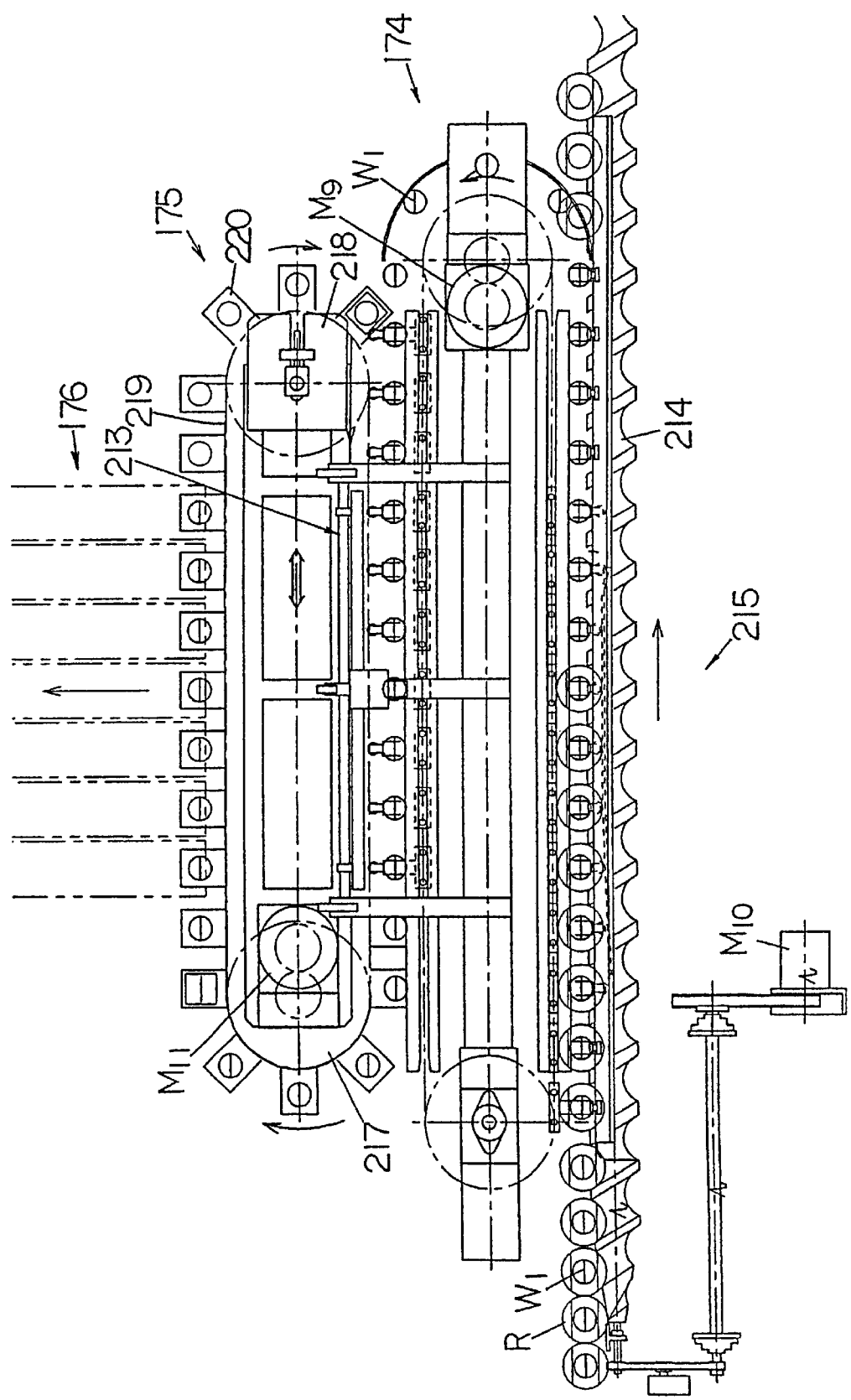
FIG. 24 is a plan view of the discharge device.
Figure 25:
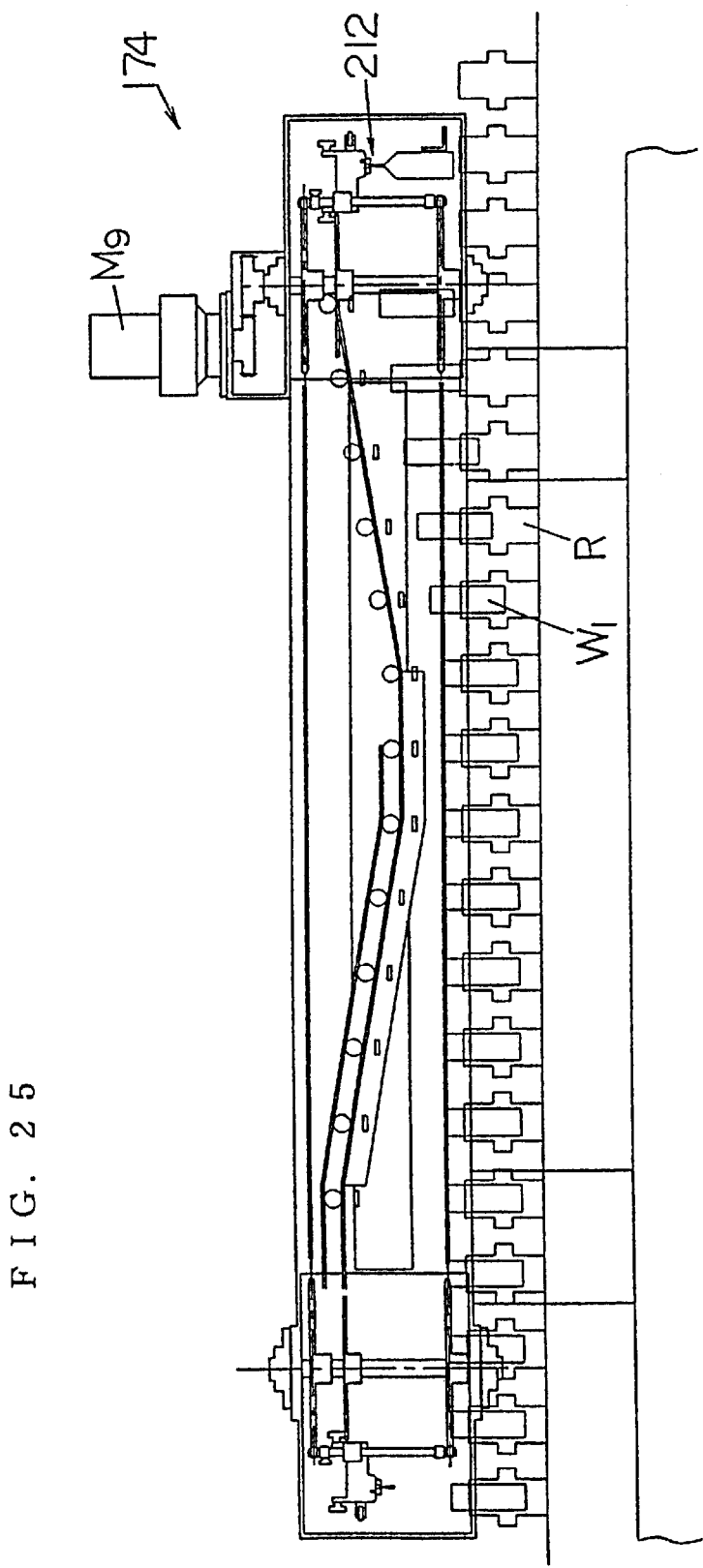
FIG. 25 is a side view of the loop type transfer device.
Figure 26:
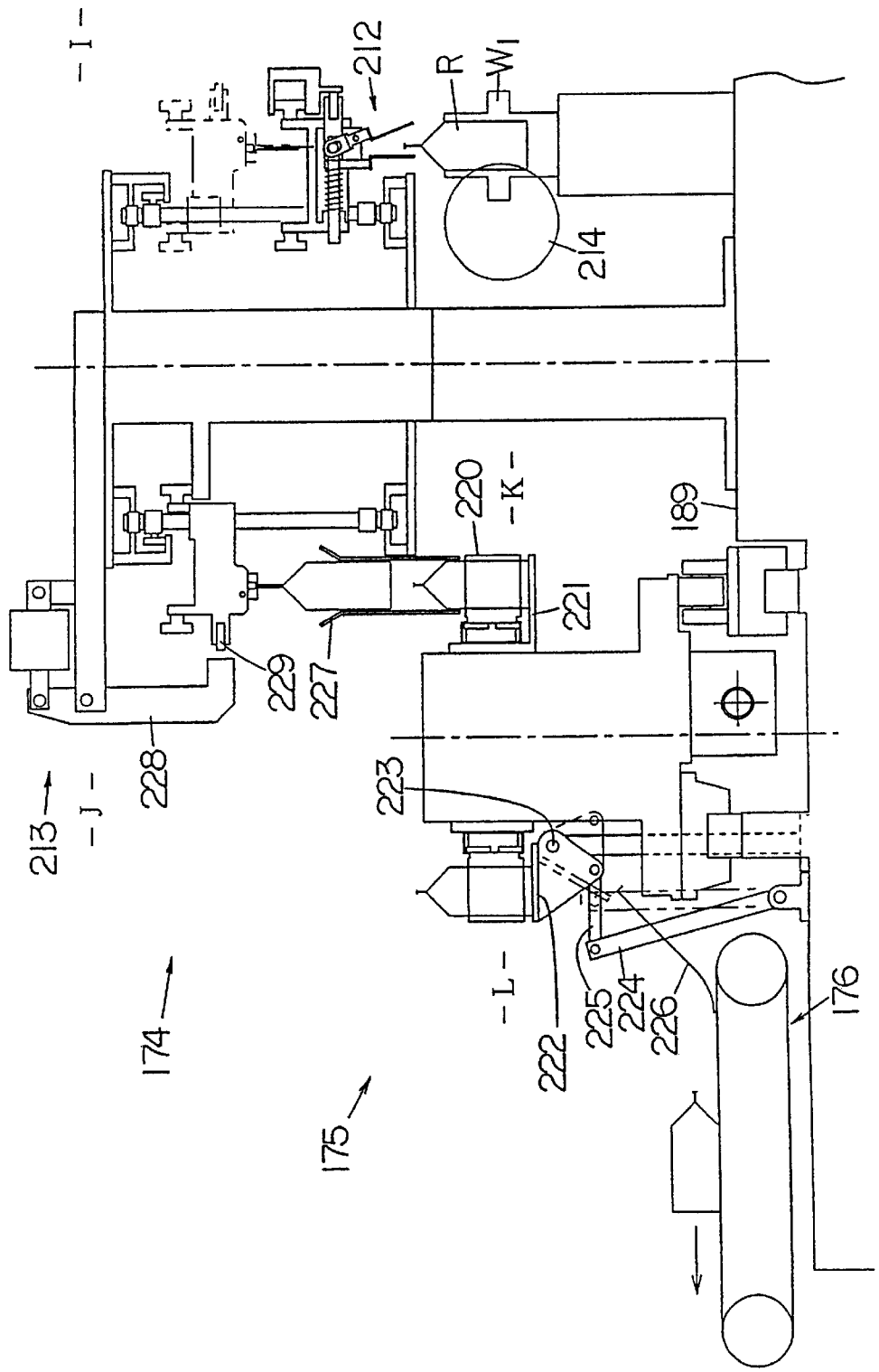
FIG. 26 is a sectional front view of the discharge device.
Figure 27:
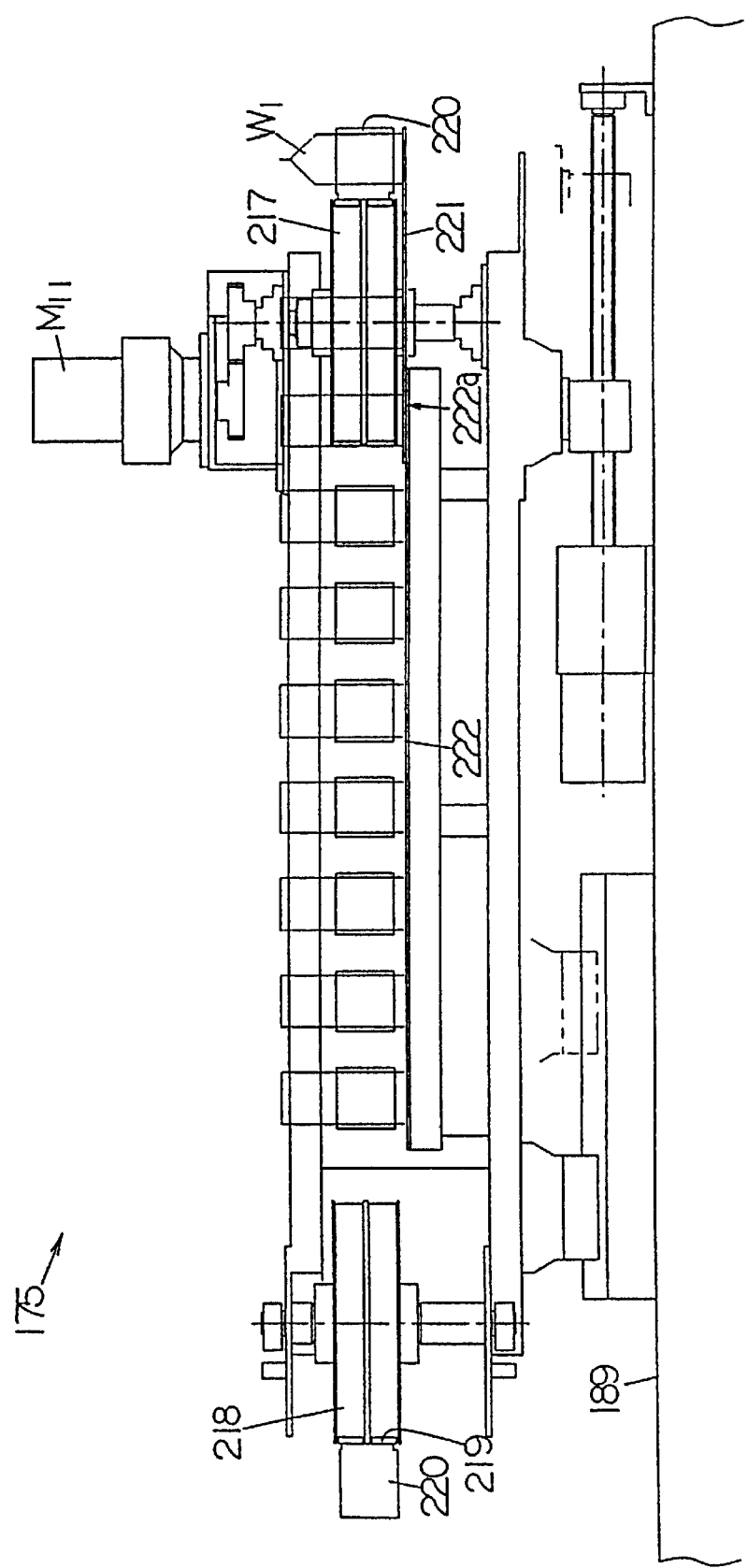
FIG. 27 is a side view of the full-bag holding member conveying device.

FIGS. 18 through 27 illustrate another example in which the present invention is applied to a retainer type continuous-filling packaging system. FIG. 18 is a schematic plan view of such a system.

In this retainer type continuous-filling packaging system, rotary type processing devices 160 through 169 which are used to perform various types of filling and packaging processing are installed via respective star wheels; and the insertion of empty bags into retainers, and the opening of the bag mouths and the filling of the bags with a liquid, as well as a first sealing, second sealing and cooling-sealing, are continuously performed. The retainers that has left the cooling-sealing device 164 are fed onto a rectilinear conveying path 166 via a star wheel 165. Here, the full bags are extracted while the retainers are being continuously conveyed at a constant speed, and the empty retainers are again fed into the insertion device 160 via conveying paths 167 and 168.

A continuous bag supply device 169 is installed in the vicinity of the insertion device 160. This continuous bag supply device 169 comprises an empty-bag holding member conveying device 170, an intermittent bag supply device 171 and a rotary type transfer device 172, and it continuously supplies empty bags to the insertion device 160. The intermittent bag supply device 171 is the same as the intermittent bag supply device 65 described previously. Moreover, a discharge device 173 is installed in the vicinity of the conveying path 166. This discharge device 173 comprises a loop type transfer device 174, a full-bag holding member conveying device 175 and a product-conveying conveyor 176. The empty bags are continuously supplied via the rotary type transfer device 172, and the full-bag holding member conveying device 175 continuously extracts the full bags via the loop type transfer device 174. Thus, the empty-bag holding member conveying device 170 differs from the empty-bag holding member conveying device 21 and full-bag holding member conveying device 25. However, the basic movements (intermittent movement on the first side of the parallel sections, and continuous movement on the second side of parallel section) and driving mechanism are the same as those of the devices 21 and 25.

First, the continuous bag supply device 169 will be described with reference to FIGS. 19 through 23.

The empty-bag holding member conveying device 170 which forms a part of this continuous bag supply device 169 has a conveyor belt (timing belt) 179 which is driven by a driving motor (servo motor) $M_7$ and is mounted between a pair of pulleys 177 and 178 that rotate horizontally. Numerous two-sided guides 180a and 180b and longitudinal grooves demarcated by these guides, i.e., numerous empty-bag holding members 180, are disposed at equal intervals on the outer circumferential surface of the conveyor belt 179. These empty-bag holding members 180 are moved in one direction along a ring-form track that has a pair of parallel sections. In this case, the empty-bag holding members 180 are moved intermittently by a specified distance at a time (this distance being equal to an integral multiple of the attachment spacing of the empty-bag holding members 180) on the bag entry side G and are moved continuously at a constant speed on the bag exit side H.

Opening-and-closing bag guides 181 and 182 which guide the movement of the empty bags W supplied to the empty-bag holding members 180 are installed along the track of the empty-bag holding members 180 in positions above and below the empty-bag holding members 180 on the bag entry side G. These guides 181 and 182 are caused to open and close (see solid line and two-dot chain line in FIG. 21) simultaneously via opening-and-closing mechanisms 184 and 185 by the operation of an air cylinder 183. When these guides are closed, the upper opening-and-closing bag guide 181 is positioned in front of the empty bags W, and the opening-and-closing bag guide 182 is positioned in front of the empty bags and simultaneously supports the bottoms of the empty bags. The timing of the opening and closing of the guides 181 and 182 is set so that the guides are opened immediately prior to the stopping of the empty-bag holding members 180, thus allowing the supply of empty bags W to the empty-bag holding members 180, and so that the guides are closed immediately after the empty bags W have been supplied, thus preventing the empty bags W supplied to the longitudinal grooves of the empty-bag holding members 180 from dropping out or jumping forward and thus guiding the movement of the bags. Moreover, the lengths of these opening-and-closing bag guides 181 and 182 are set so that they are more or less equal to the width occupied by the plurality of empty-bag holding members 180 to which empty bags W have been supplied.

Fixed bag guides 186 and 187 are installed above and below so that they are in the range extending from the ends of the opening-and-closing bag guides 181 and 182 around the pulley 177 and up to the vicinity of the rotary type transfer device 172. The fixed bag guides 186 and 187 further prevent the empty bags W from dropping and jumping out.

A rotary type transfer device 172 which is equipped on its outer circumference with numerous transfer means 188 having the same spacing as the attachment spacing of the empty-bag holding members 180 is installed beyond the edges of the fixed bag guides 186 and 187 on the bag exit side H. This rotary type transfer device 172 is equipped with a supporting stand 191, that is installed upright on a bed 189, and a rotor 192, that is caused to rotate continuously by a driving motor (servo motor), which is not shown in the figure. Transfer means 188 which chuck the empty bags W by means of vacuum suction are formed on the circumferential surface of the head 193 of the rotor, and branches of a vacuum passage 194 formed in this rotor head 193 open on the side surfaces of the transfer means 188. This vacuum passage 194 extends to a position rotated 180° C. from the position facing the front surfaces of the empty-bag holding members 180 and is connected to a vacuum pump (not shown) via a vacuum port 195 formed in the supporting stand 191. Furthermore, at the position rotated 180° C., this vacuum passage 194 is connected to a port 196 that opens to the atmosphere.

The transfer means 188 of the rotary type transfer device 172 undergo continuous horizontal rotation at the same speed and timing as the continuously moving empty-bag holding members 180. These transfer means 188 continuously receive empty bags W from the empty-bag holding members 180 by vacuum-chucking these empty bags W and then transfer these empty bags W to the insertion device 160 after completion of a half-rotation. Furthermore, extraction guides 197 and 198 are installed above and below beyond the ends of the fixed bag guides 186 and 187. The extraction guides 197 and 198 contact the rear sides of the empty bags W, guide the empty bags W along the rotational track of the transfer means 188, and assist the vacuum-chucking by the transfer means 188.

The insertion device 160 is equipped with numerous bag holding means 200, which are installed at equal intervals on the outer circumference of its rotor 199, and numerous retainer holding means 201, which are installed in positions beneath the bag holding means 200. The installation spacing of the bag holding means 200 and retainer holding means 201 is the same as the installation spacing of the transfer means 188; and the rotation of the rotor 199 by the driving motor (servo motor) $M_8$ is set so that the bag holding means 200 rotate at the same speed and with the same timing as the transfer means 188.

The bag holding means 200 have suction plates 203 used for vacuum chucking on their tip ends. As a result of the action of a cam 204 and cam rollers 205, these bag holding means 200 are moved upward and downward along slide shafts 206. These bag holding means 200 are in their upper-limit positions when they extract empty bags W from the transfer means 188; and then the bag holding means 200 are lowered as they rotate and insert the empty bags into the retainers R below. Following this insertion, the bag holding means 200 again return to their upper-limit positions.

The operation of the continuous bag supply device 169 described above will again be briefly described.

The empty-bag holding member conveying device 170 operates in the same manner as the previously described empty-bag holding member conveying device 21. The empty-bag holding members 180 are moved intermittently on the bag entry side G; and when these empty-bag holding members 180 are stopped, empty bags W are supplied to a plurality of empty-bag holding members 180 from the intermittent bag supply device 171. Then, the empty-bag holding members 180 are moved together with the empty bags W. Meanwhile, on the bag exit side H, the empty-bag holding members 180 are moved continuously at a constant speed. On the bag exit side H, further, the transfer means 188 of the rotary type transfer device 172 are rotated continuously in synchronization with the empty-bag holding members 180 and continuously receive the empty bags W inside the empty-bag holding members 180 by vacuum-chucking. After completion of a half-rotation, the transfer means 188 transfer the bags to the empty-bag holding means 200 disposed on the rotor 199 of the insertion device 160.

Next, the discharge device 173 in the present invention will be described with reference to FIGS. 24 through 27.

The loop type transfer device 174 which is a part of the discharge device 173 is similar in structure to the rotational conveying mechanism 27 of the full-bag holding member conveying device 25 described above. However, this loop type transfer device 174 differs from the rotational conveying mechanism 27 in that the device itself does not perform a reciprocating movement and in that the driving motor (servo motor) $M_9$ causes the transfer means 212 (corresponding to the full-bag holding members 106 of the rotational conveying mechanism 27) to move at a constant speed along a fixed-position ring-form track that has a pair of parallel sections. This loop type transfer device 174 further differs from the rotational conveying mechanism 27 in that a transfer means release device 213 (corresponding to the full-bag holding member release device 134 of the rotational conveying mechanism 27) is installed on this loop type transfer device 174 itself.

One of the parallel sections (bag entry side I) of the fixed-position ring-form track is disposed along the conveying path 166. A retainer conveying device 215 which has a screw conveyor 214 that is caused to rotate by a driving motor (servo motor) $M_{10}$ is installed on this conveying path 166. This retainer conveying device 215 conveys the retainers R at the same conveying speed and same conveying pitch as the transfer means 212 and in a state in which the retainers R are aligned with the transfer means 212 in the vertical direction. Furthermore, a full-bag holding member conveying device 175 is installed on the other parallel section (bag exit side J) of the fixed-position ring-form track.

The full-bag holding member conveying device 175 has a conveyor belt (timing belt) 219 which is mounted on a pair of pulleys 217 and 218 that are driven by a driving motor (servo motor) $M_{11}$ so that these pulleys are caused to rotate horizontally. Also, numerous case-form full-bag holding members 220 are disposed at equal intervals on the outer circumferential surface of this conveyor belt 219. These full-bag holding members 220 are moved in one direction along a ring-form track that has a pair of parallel sections. During this movement, the full-bag holding members 220 are moved continuously at a constant speed on the bag entry side K of the parallel sections; and on the bag exit side L, the full-bag holding members 220 are moved intermittently by a specified distance at a time. This specified distance is an integral multiple of the attachment spacing of the full-bag holding members 220. On the bag entry side K, the full-bag holding members 220 are moved at the same conveying speed and same conveying pitch as the transfer means 212 and in a state in which the full-bag holding members 220 are aligned with the transfer means 212 in the vertical direction.

A fixed bag bottom supporting plate 221 which prevents the full bags $W_1$ supplied to the full-bag holding members 220 from dropping out is provided so that this plate extends from the position beneath the full-bag holding members 220 on the bag entry side K to the bag exit side L. Furthermore, on the bag exit side L, a movable bag bottom supporting plate 222 is installed on the bed 189 as a continuation of the fixed bag bottom supporting plate 221, so that the bottom portions of the full bags $W_1$ are supported. This movable bag bottom supporting plate 222 is supported on a fulcrum shaft 223, and it is arranged so that when the full-bag holding members 220 are stopped on the bag exit side L, this supporting plate 222 is pushed over by a driving means (not shown) via a lever 224 and link 225 so that the supporting plate 222 faces outward (shown by the two-dot chain lines in FIG. 26), thus discharging the full bags $W_1$ in the full-bag holding members 220. The full bags $W_1$ slip downward along the movable bag bottom supporting plate 222, so that the bags are placed in a plurality of rows on the product-conveying conveyor 176 via the discharge chute 226 and are thus discharged. The movable bag bottom supporting plate 222 partially overlaps with the underside of the fixed bag bottom supporting plate 221, and this overlapping portion 222a slides across the undersurface of the fixed bag bottom supporting plate 221 that reciprocates.

The operation of the discharge device 173 described above will again be briefly described.

The transfer means 212 of the loop type transfer device 174 are moved synchronously above the retainers R which are conveyed at a constant speed along the conveying path 166. During this movement, the transfer means 212 are lowered and grasp the full bags $W_1$. The transfer means 212 are then raised and extract the full bags $W_1$ from the retainers R and further convey the full bags at a constant speed toward the bag exit side J. On the bag exit side J, the full bags $W_1$ grasped by the transfer means 212 are conveyed while being clamped by the insertion guide 227.

On the bag exit side J of the loop type transfer device 174, i.e., on the bag insertion side K of the full-bag holding member conveying device 175, the transfer means release device 213 operates at a fixed timing so that the lever 228 pushes the cam followers 229 of a plurality of transfer means 212, thus releasing the transfer means 212 and dropping the full bags $W_1$. As a result, the full bags are transferred to the full-bag holding members 220 which are continuously moving in synchronization below.

The full-bag holding members 220 that have received the full bags $W_1$ on the bag entry side K are moved to the bag exit side L. Here, the full-bag holding members 220 are moved intermittently; and while these full-bag holding members 220 are stopped, the movable bag bottom supporting plate 222 is pushed over so that it faces outward. As a result, the full bags $W_1$ held in a plurality of the full-bag holding members 220 drop onto the product-conveying conveyor 176 and are discharged in a state in which the bags are lined up in a plurality of rows.

As shown by the two-dot chain lines in FIG. 18, the full bags $W_1$ that have been discharged in a plurality of rows are divided into different lines, two rows at a time, and are respectively conveyed to a subsequent process such as packing in boxes, etc.

Figure 28:
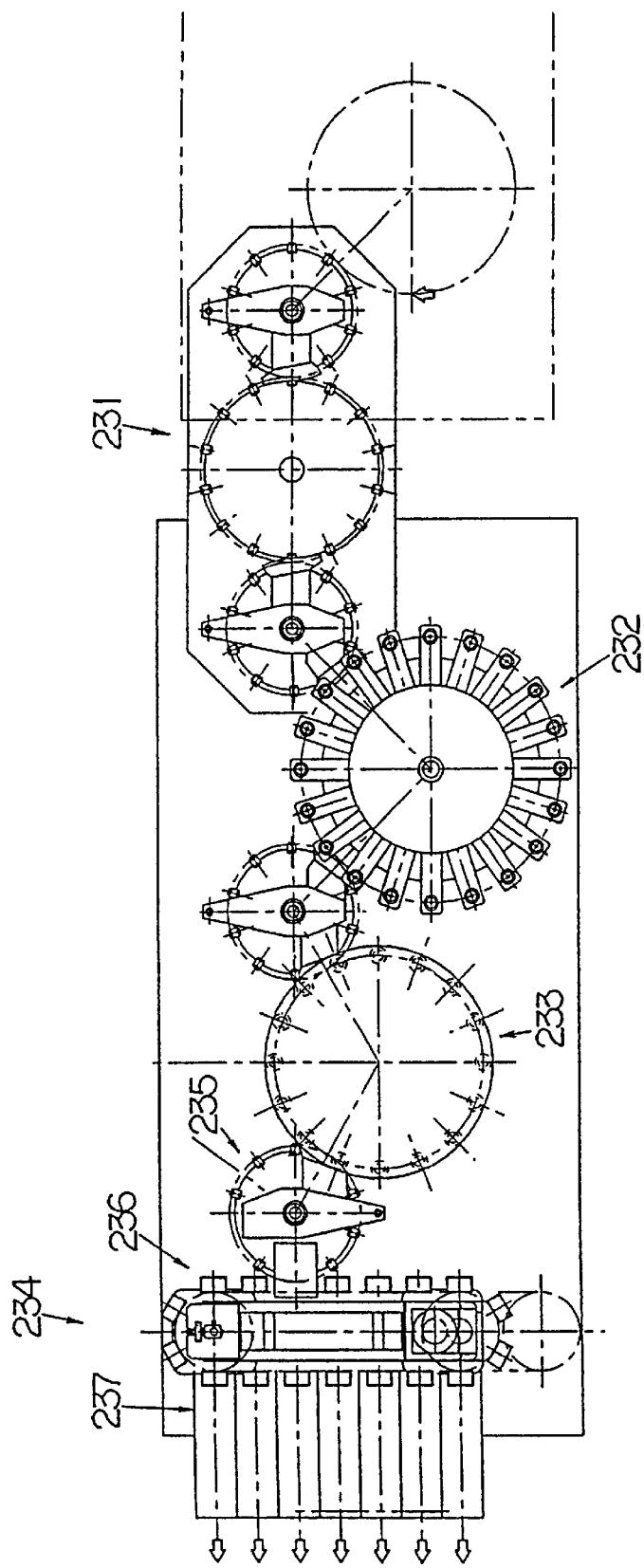
FIG. 28 is an overall schematic view of the continuous-filling packaging system for spout-equipped bags according to the present invention.
Figure 29A:
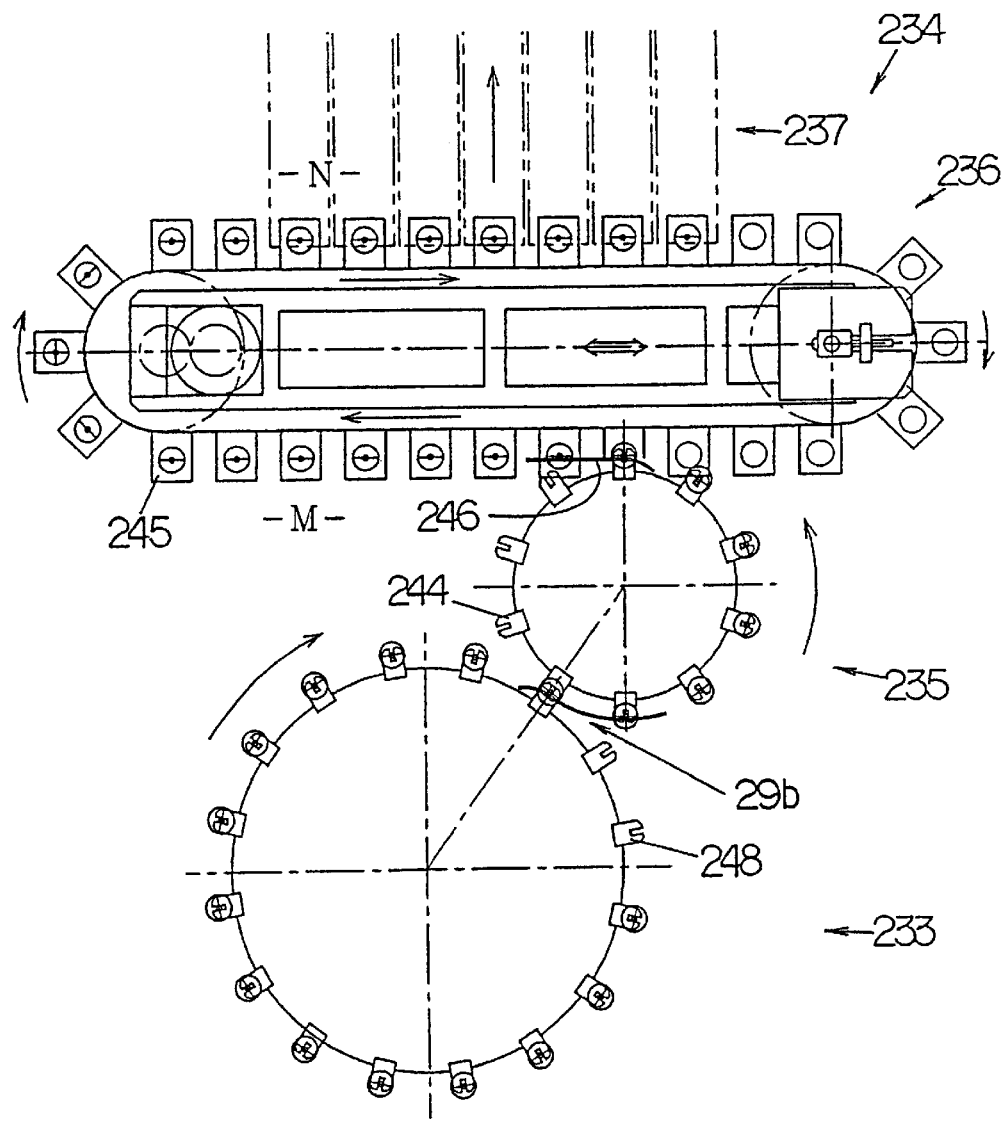
FIG. 29(a) shows a plan view of the discharge device.
Figure 29B:
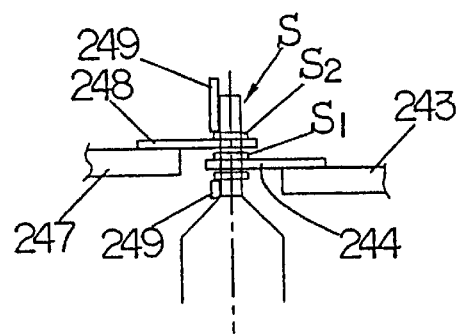
FIG. 29(b) is an enlarged view taken in the direction of arrow 29b of FIG. 29(a)
Figure 30:
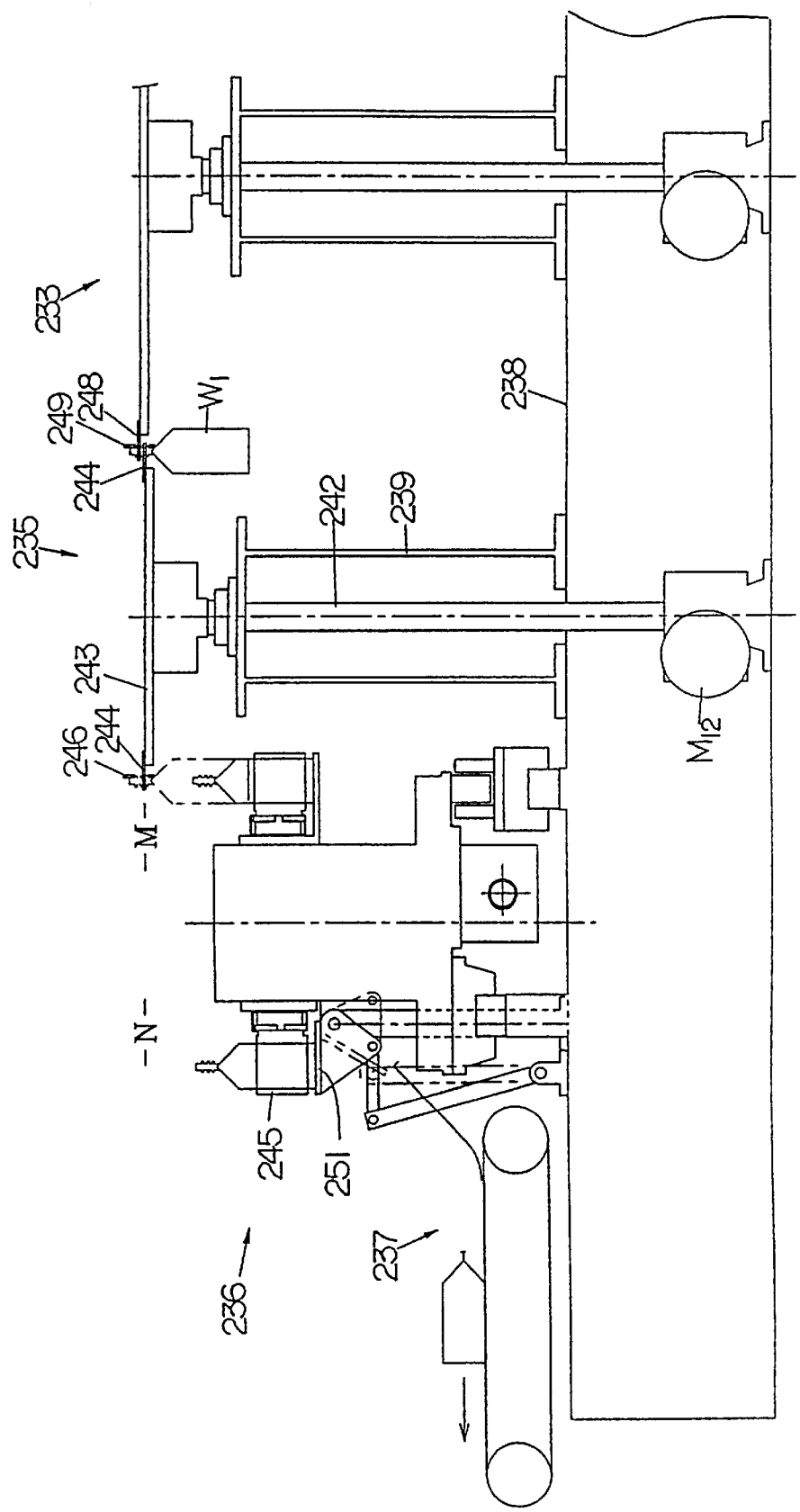
FIG. 30 is a sectional front view of the discharge device.

FIGS. 28 through 30 illustrate an example in which the present invention is applied to a continuous-filling packaging system for spout-equipped bags. FIG. 28 is a schematic plan view of this continuous-filling packaging system (showing mainly the parts of the discharge device).

This continuous-filling packaging system is also a rotary type system. Processing devices which are used to perform various types of filling and packaging processing and which are universally known, are installed via respective rotary transfer devices. After the insertion of spouts into the empty bags and temporary and main sealing have been performed in particular areas which are not shown in the figures, the bags pass through a rotary type transfer device groups 231; after which filling with liquid is performed by means of a filling device 232, and cap attachment is performed by a cap tightening device 233. The bags are then discharged by the discharge device 234 of the present invention.

A rotary type insertion device which continuously inserts spouts into empty bags is described in, for example, Japanese Patent Application Laid-Open (Kokai) No. H10-202768. The supply of empty bags to this rotary type insertion device can be accomplished using the continuous bag supply device 169.

The above-described discharge device 234 will be described with reference to FIGS. 29 and 30.

The discharge device 234 comprises a rotary type transfer device 235, a full-bag holding member conveying device 236 and a product-conveying conveyor 237. The latter two components respectively have the same structures as the full-bag holding member conveying device 175 and product-conveying conveyor 176 described above and perform the same operations.

The rotary type transfer device 235 is provided with a supporting stand 239, which is installed in an upright position on a bed 238, and a rotor 242, which is caused to rotate continuously by a driving motor (servo motor) $M_{12}$. A plurality of transfer means which hold the full bags, i.e., holding claws 244 which catch on the flange parts $S_1$ of the spouts S, are attached to the circumferential surface of the head 243 of the rotor at equal intervals. The spacing of these holding claws 244 is the same as the attachment spacing of the full-bag holding members 245 attached to full-bag holding member conveying device 236. These holding claws 244 undergo continuous horizontal rotation above the continuously moving full-bag holding members 245 at the same speed and timing as the full-bag holding members 245 and continuously transfer the held full bags $W_1$ to the case-form full-bag holding members 245. Extraction guides 246 which come into contact with the spout S and horizontally extract (i.e., push to the outside in the radial direction) the full bag $W_1$ from each of the holding claws 244 are provided above and below the holding claw 244 at the transfer location.

A plurality of holding claws 248 which catch on a different flange part $S_2$ of the spout S (a flange above $S_1$) are attached (in the same manner as the holding claws 244) at equal intervals to the outer circumference of the rotor 247 of the cap tightening device 233 (only the portion involved in the conveying of the full bags $W_1$ is shown in the figures). The spacing of these holding claws 248 is the same as the attachment spacing of the holding claws 244. These holding claws 248 undergo continuous horizontal rotation at the same speed and timing as the continuously rotating holding claws 244 but in positions slightly higher than those of the holding claws 244. As a result, these holding claws 248 continuously transfer the held full bags $W_1$ to the holding claws 244. Extraction guides 249, which come into contact with the spout S and extract the full bag $W_1$ horizontally from each holding claw 248 and further push the bag into the holding claw 244, are installed above and below the holding claws 244 and 248 at the transfer location.

The operation of the discharge device 234 described above will again be briefly described.

On the bag entry side M of the full-bag holding member conveying device 236, the full-bag holding members 245 are moved continuously at a constant speed, and the holding claws 244 of the rotary type transfer device 235 are rotated continuously in synchronization with the full-bag holding members 245 above the full-bag holding members 245. When the full-bag holding members 245 and holding claws 244 reach a point where these elements are in close proximity to each other, the spout of each full bag $W_1$ contacts the extraction guide 246; as a result, the full bag $W_1$ is extracted and drops downward so that the full bag $W_1$ is transferred to the corresponding full-bag holding member 245.

The full-bag holding members 245 that have received full bags $W_1$ on the bag entry side M are moved to the bag exit side N; and the full-bag holding members 245 are moved intermittently on the bag exit side N. When the full-bag holding members 245 are stopped during the intermittent movement, the movable bag bottom supporting plate 251 is pushed over so that it faces outward, the full bags $W_1$ held inside a plurality of the full-bag holding members 245 drop onto the product-conveying conveyor 237, and these bags are discharged in a state in which these bags are lined up in a plurality of rows.

As seen from the above, according to the present invention, in a continuous-filling packaging system for containers, an intermittent container discharge device, which converts the movement of full containers (filled containers) that are continuously conveyed in a single row into an intermittent movement in a plurality of rows and discharges the full containers out of the packaging system, is provided. As a result, the present invention improves the production efficiency of the filling packaging system as a whole since high-speed operation can be performed.

What is claimed is:

1. An intermittent container discharge device which is, in a continuous-filling packaging system, for converting a movement of full containers continuously fed in a single row into an intermittent movement of a plurality of rows, wherein said device is provided with:
   a container holding member conveying device in which container holding members disposed at equal intervals are moved in one direction along a ring-form track which has a pair of parallel sections, so that said container holding members are moved continuously at a constant speed on a first side of said parallel sections and moved intermittently a certain distance, which is an integral multiple of an attachment spacing of said container holding members, on a second side of said parallel sections, and
   said intermittent container discharge device continuously receives full containers by means of said continuously moving container holding members on said first side of said parallel sections and discharges full containers in a plurality of rows from said container holding members, which are stopped, on said second side of said parallel sections.

2. The intermittent container discharge device according to claim 1, wherein,
   said continuous-filling packaging system is a retainer type system; and wherein
   a retainer conveying device that continuously conveys a plurality of retainers, which accommodate full containers therein, at the same intervals as intervals of said container holding members and at a same speed as a movement speed of said container holding members along said first side of said parallel sections is provided, and
   said full containers accommodated in said retainers are received by said container holding members.

3. The intermittent container discharge device according to claim 2, wherein said container holding members are raised and lowered while being moved along said ring-form track, so that said container holding members are lowered on said first side of said parallel sections so as to grip said full containers accommodated in said retainers and are raised so as to extract said full containers from said retainers.

4. The intermittent container discharge device according to claim 1, wherein a loop type transfer device in which a plurality of transfer means disposed at equal intervals are moved continuously at a constant speed along a fixed-position ring-form track that has a pair of parallel sections is installed on a first side of said parallel sections, and said loop type transfer device continuously receives full containers by said transfer means, which is continuously moving, on said first side of said parallel sections of said fixed-position ring-form track and continuously supplies said full containers to said container holding members, which is continuously moving, on a second side of said parallel section.

5. The intermittent container discharge device according to claim 4, wherein
   said continuous-filling packaging system is a retainer type system; and wherein
   a retainer conveying device that conveys a plurality of retainers, which accommodate full containers therein, at the same intervals as intervals of said transfer means and at a same speed as a movement speed of said transfer means along said first side of said parallel sections of said fixed-position ring-form track of said loop type transfer device, and
   said full containers accommodated in said retainers which are moving continuously are received by said transfer means.

6. The intermittent container discharge device according to claim 5, wherein said transfer means are raised and lowered while being moved along said fixed-position ring-form track, so that on said first side of said parallel sections said transfer means are lowered to grip said full containers accommodated in said retainers and are raised to extract said full containers from said retainers.

7. The intermittent container discharge device according to claim 1, wherein a rotary type transfer device which has a plurality of transfer means disposed at equal intervals is installed on said first side of said parallel sections, and said rotary type transfer device continuously receives said full containers from a device used in a preceding process, by said transfer means, which is rotating continuously, and then continuously supplies said full containers to said container holding members.

8. The intermittent container discharge device according to claim 1, 2, 3, 4, 5, 6 or 7, wherein a product-conveying device which receives said full containers discharged in a plurality of rows from said container holding members and conveys said full containers in said plurality of rows is installed on said second side of said parallel section of said ring-form track.

9. The intermittent container discharge device according to claim 1, 2, 3, 4, 5, 6 or 7, wherein said container holding member conveying device is equipped with:
   a rotational conveying mechanism which causes a rotational conveyance of said plurality of container holding members disposed at equal intervals in one direction along said ring-form track which has said pair of parallel sections, and
   a reciprocating driving mechanism which causes said rotational conveying mechanism as a whole to perform a reciprocating movement for a specified distance along said parallel sections; and wherein said rotational conveying mechanism and reciprocating driving mechanism are respectively provided with their own driving sources, and said container holding members have a movement speed obtained by synthesizing said rotational conveyance and said reciprocating movement.

10. The intermittent container discharge device according to claim 8, wherein said container holding member conveying device is equipped with:

a rotational conveying mechanism which causes a rotational conveyance of said plurality of container holding members disposed at equal intervals in one direction along said ring-form track which has said pair of parallel sections, and a reciprocating driving mechanism which causes said rotational conveying mechanism as a whole to perform a reciprocating movement for a specified distance along said parallel sections; and wherein said rotational conveying mechanism and reciprocating driving mechanism are respectively provided with own driving sources, and said container holding members have a movement speed obtained by synthesizing said rotational conveyance and said reciprocating movement.

* * * * *

UNITED STATES PATENT AND TRADEMARK OFFICE
CERTIFICATE OF CORRECTION

PATENT NO. : 6,419,076 B1
DATED : July 16, 2002
INVENTOR(S) : Shoji Tsutsui

It is certified that error appears in the above-identified patent and that said Letters Patent is hereby corrected as shown below:

<u>Title page,</u>
Item [73], Assignee, change "Toya Jidoki Co., Ltd., Tokyo (JP)" to
-- Toyo Jidoki Co., Ltd., Tokyo (JP) --

Signed and Sealed this

Thirty-first Day of August, 2004

JON W. DUDAS
*Director of the United States Patent and Trademark Office*